(12) United States Patent  
Kobayashi

(10) Patent No.: US 9,122,976 B2  
(45) Date of Patent: Sep. 1, 2015

(54) PRINTING DEVICE CAPABLE OF CANCELING PRINT JOB, PRINTING METHOD, AND STORAGE MEDIUM

(71) Applicants: CASIO ELECTRONICS MANUFACTURING CO., LTD., Iruma-shi, Saitama (JP); CASIO COMPUTER CO., LTD., Tokyo (JP)

(72) Inventor: Masaki Kobayashi, Higashiyamato (JP)

(73) Assignees: CASIO ELECTRONICS MANUFACTURING CO., LTD., Iruma-shi, Saitama (JP); CASIO COMPUTER CO., LTD., Tokyo (JP)

( * ) Notice: Subject to any disclaimer, the term of this patent is extended or adjusted under 35 U.S.C. 154(b) by 74 days.

(21) Appl. No.: 13/630,747

(22) Filed: Sep. 28, 2012

(65) Prior Publication Data

US 2013/0083360 A1   Apr. 4, 2013

(30) Foreign Application Priority Data

Sep. 30, 2011   (JP) ................................ 2011-218584

(51) Int. Cl.
*G06F 3/12*   (2006.01)
*G06K 15/02*   (2006.01)
*G06K 15/00*   (2006.01)

(52) U.S. Cl.
CPC ........ *G06K 15/1817* (2013.01); *G06K 15/1806* (2013.01); *G06K 15/408* (2013.01)

(58) Field of Classification Search
USPC ................................................ 358/1.13–1.18
See application file for complete search history.

(56) References Cited

U.S. PATENT DOCUMENTS 6,362,892 B1 *   3/2002   Lee et al. ..................... 358/1.13
6,947,165 B1 *   9/2005   Kataoka ...................... 358/1.16
(Continued)

FOREIGN PATENT DOCUMENTS

JP   2002196909 A   7/2002
JP   2002-366317 A   12/2002
(Continued)

OTHER PUBLICATIONS

Japanese Office Action dated Nov. 19, 2013 (and English translation thereof) in counterpart Japanese Application No. 2011-218584.
(Continued)

*Primary Examiner* — Marivelisse Santiago Cordero
*Assistant Examiner* — Kevin Ky
(74) *Attorney, Agent, or Firm* — Holtz, Holtz, Goodman & Chick PC

(57) ABSTRACT

The printing device is a printing device having a reception part receiving print data, a print job information storage storing print job information of the print data, an image data conversion part concerting the print data to image data, a print queue generation part generating print queue information administrating the print data on the basis of page upon conversion from the print data to image data, a print job ID storage storing the print job ID at the time of an order when job cancellation is ordered, and a control part comparing the print job ID stored in the print job ID storage with the print job ID at the time of execution in execution of job cancellation and cancelling the print job ID when the print job IDs are equal. The printing device allows job cancellation to be specified without multiple panel operations in ordering job cancellation order.

14 Claims, 26 Drawing Sheets

(56) References Cited

U.S. PATENT DOCUMENTS

| | | |
|---|---|---|
| 7,242,488 B2 | 7/2007 | Matsueda |
| 7,880,923 B2 | 2/2011 | Kato |
| 8,451,467 B2 | 5/2013 | Sato |
| 2007/0285674 A1* | 12/2007 | Shahindoust et al. .......... 358/1.1 |
| 2009/0147306 A1* | 6/2009 | Sugiyama .................... 358/1.15 |
| 2009/0180142 A1* | 7/2009 | Suzuki et al. ................ 358/1.15 |
| 2011/0013221 A1* | 1/2011 | Kang et al. .................. 358/1.15 |

FOREIGN PATENT DOCUMENTS

| | | |
|---|---|---|
| JP | 2006-051615 A | 2/2006 |
| JP | 2007094721 A | 4/2007 |
| JP | 2008-036999 A | 2/2008 |
| JP | 2008-040809 A | 2/2008 |
| JP | 2009-083266 A | 4/2009 |
| JP | 2010-158791 A | 7/2010 |

OTHER PUBLICATIONS

Japanese Office Action dated Aug. 13, 2013 (and English translation thereof) in counterpart Japanese Application No. 2011-218584.

Japanese Office Action dated Aug. 26, 2014, issued in counterpart Japanese application No. 2013-213424.

* cited by examiner

FIG. 2

| RECORD NUMBER | JOB ID | DOCUMENT NAME | TOTAL NUMBER OF PRINT SHEETS | REMAINING NUMBER OF PRINT SHEETS | RECEPTION BUFFER ADDRESS | JOB STATUS |
|---|---|---|---|---|---|---|
| 1 | EMPTY | NONE | 0 | -1 | 0 | NONE |
| 2 | EMPTY | NONE | 0 | -1 | 0 | NONE |
| 3 | EMPTY | NONE | 0 | -1 | 0 | NONE |
| 4 | EMPTY | NONE | 0 | -1 | 0 | NONE |
| 5 | EMPTY | NONE | 0 | -1 | 0 | NONE |

FIG. 3

| PRINT QUEUE STATE |
|---|
| PRINT QUEUE TABLE |

FIG. 4

| RECORD NUMBER | JOB ID | CURRENT PAGE NUMBER | IMAGE MEMORY ADDRESS | DRAWING STATE | JOB CANCELLATION INFORMATION |
|---|---|---|---|---|---|
| 1 | EMPTY | 0 | 0 | NONE | NONE |
| 2 | EMPTY | 0 | 0 | NONE | NONE |
| 3 | EMPTY | 0 | 0 | NONE | NONE |
| 4 | EMPTY | 0 | 0 | NONE | NONE |
| 5 | EMPTY | 0 | 0 | NONE | NONE |
| 6 | EMPTY | 0 | 0 | NONE | NONE |
| 7 | EMPTY | 0 | 0 | NONE | NONE |
| 8 | EMPTY | 0 | 0 | NONE | NONE |
| 9 | EMPTY | 0 | 0 | NONE | NONE |
| 10 | EMPTY | 0 | 0 | NONE | NONE |

FIG. 5

| | |
|---|---|
| NUMBER OF QUEUES | 0 |
| WRITING POSITION | 1 |
| READING POSITION (TRANSFER) | 1 |
| READING POSITION (PAPER EJECTION) | 1 |

FIG. 6

| RECORD NUMBER | JOB ID | DOCUMENT NAME | TOTAL NUMBER OF PRINT SHEETS | REMAINING NUMBER OF PRINT SHEETS | RECEPTION BUFFER ADDRESS | JOB STATUS |
|---|---|---|---|---|---|---|
| 1 | J0004 | Price List | 9 | 7 | 0 | PRINTING |
| 2 | J0005 | LAYOUT DIAGRAM | 1 | -1 | 0 | PRINTING |
| 3 | J0006 | MEETING MATERIAL | 14 | -1 | 0x8000A064 | IN RIP |
| 4 | J0007 | BUDGET PROPOSAL | 5 | -1 | 0x8000CB18 | RECEIVING |
| 5 | EMPTY | NONE | 0 | -1 | 0 | NONE |

FIG. 7

| RECORD NUMBER | JOB ID | CURRENT PAGE NUMBER | IMAGE MEMORY ADDRESS | DRAWING STATE | JOB CANCELLATION INFORMATION |
|---|---|---|---|---|---|
| 1 | J0004 | 9 | 0x8081012C | DRAWING COMPLETED | NONE |
| 2 | J0005 | 1 | 0x80C10140 | DRAWING COMPLETED | NONE |
| 3 | J0006 | 1 | 0x81C10154 | DRAWING COMPLETED | NONE |
| 4 | J0006 | 2 | 0x81410168 | DRAWING COMPLETED | NONE |
| 5 | J0006 | 3 | 0x8181017C | DRAWING COMPLETED | NONE |
| 6 | J0006 | 4 | 0x81C10190 | DRAWING COMPLETED | NONE |
| 7 | J0006 | 5 | 0x820101A4 | DRAWING | NONE |
| 8 | EMPTY | 0 | 0 | NONE | NONE |
| 9 | EMPTY | 0 | 0 | NONE | NONE |
| 10 | J0004 | 8 | 0x80400118 | TRANSFER | NONE |

FIG. 8

| NUMBER OF QUEUES | 8 |
|---|---|
| WRITING POSITION | 7 |
| READING POSITION (TRANSFER) | 1 |
| READING POSITION (PAPER EJECTION) | 10 |

PRINTING DEVICE CAPABLE OF CANCELING PRINT JOB, PRINTING METHOD, AND STORAGE MEDIUM

CROSS-REFERENCE TO RELATED APPLICATION

This application claims the benefit of Japanese Patent Application No. 2011-218584, filed on Sep. 30, 2011, the entire disclosure of which is incorporated by reference herein.

FIELD

This application relates to a printing device capable of canceling a print job once registered.

BACKGROUND

Nowadays, printing systems in which a host device such as a host computer and a printing device such as a printer are connected via a network are used. In such printing systems, the printing device receiving print jobs sent from the host device and executing the printing in sequence often displays on the panel information on the job in the process of printing. Therefore, when multiple print jobs are received, the print job displayed on the panel is job information in the process of printing at the time.

However, with a high speed printing device such as a page printer, multiple sheets of printing paper are conveyed in the device. For example, at the time of a sheet being about to be ejected, several new sheets have already been fed into the device from the paper feeder and conveyed within the device. If the printing device is paused in such a state, the sheets fed into the device are ejected according to a proper control; however, the device cannot be paused before the sheets are ejected. In other words, if an attempt is made to pause the printing device in the middle of continuous printing, the subsequent sheets fed into the device will jam within the device. Then, the printing device should be paused after the sheets being conveyed within the device are ejected.

On the other hand, many printing devices are capable of canceling a print job. The function of cancelling a print job is a function to pause the ongoing print job through operation on the operation panel for no further output of sheets, for example, when some wrong print setting is found after the printing starts.

Here, two panel operations are generally required for cancelling a print job. The first operation is an order to pause the printing device in operation and the second operation is an order to confirm job information and execute the job cancellation. The reason for requiring the two panel operations is that when an attempt is made to pause the aforementioned high-speed printing device at a specific moment, the printing device does not pause immediately and a print job different from the intended print job may be cancelled. Therefore, when the operator cancels a job, he/she confirms the job information after the printing device pauses and operates the panel to cancel the intended print job with no mistake.

Unexamined Japanese Patent Application Kokai Publication No. 2008-36999 discloses an image forming device determining whether a reserved and registered print job satisfies preset cancelation conditions and executing a job cancelation procedure when the cancelation conditions are satisfied so as to cancel the print job without complicate operations.

As mentioned above, two operations are conducted on the operation panel for cancelling a print job in the prior art. However, there may be the same print job at the time of the first panel operation and at the time of the second panel operation, for example, depending on the number of pages of print data. Some user who is familiar with the job cancelling operation may conduct the second panel operation without confirming the cancelation target job well. In such a case, a wrong print job may be designated as the cancellation target.

Furthermore, two panel operations for canceling a job are a burden for the user.

SUMMARY

Then, an exemplary object of the present invention is to provide a printing device eliminating the need of multiple panel operations in a job cancellation procedure to reduce the user workload and allowing the cancellation target job to be specified with no mistake.

The printing device according to a first exemplary aspect of the present invention comprises a receiver receiving a print job sent from a host device; a print processor executing printing on at least one or more recording media based on print data included in the print job received by the receiver; a job table registering and storing administrative information of the print job received by the receiver; a controller registering, upon reception of a print job by the receiver, administrative information of the print job received by the receiver in the job table, and ordering the print processor to execute printing based on the registered print job, adding information indicating that the printing is in progress to the administrative information of the print job on which the execution is ordered, inquiring of the print processor whether ejection of a recording medium corresponding to the print job on which the execution of printing is ordered from the print processor is completed, and deregistering from the job table the print job registered in the job table if an ejection completion response is made; a job cancellation inputter through which the user inputs a job cancellation order to cancel the printing of a print job in the process of printing; and a job-ID-upon-cancel-operation storage storing the ID of the print job in the process of printing when a printing cancellation order is input from the job cancellation inputter, wherein the controller outputs an order to pause the ongoing printing to the print processor according to the job cancellation order input from the job cancellation inputter; the print processor completes the ordered pause of printing and makes a response indicating the completion of pause of printing to the controller; and the controller compares the ID of the print job registered in the job table as in the process of printing with the ID stored in the job-ID-upon-cancel-operation storage, and cancels the printing of the print job having the print job ID when the ID of the registered print job and the stored ID are equal in spite of time difference between the time the job cancellation inputter received the job cancellation order and the time the print processor received the response indicating the completion of pause of printing.

The printing device according to a second exemplary aspect of the present invention comprises a receiver receiving a print job sent from a host device; a print processor executing printing on at least one or more recording media based on print data included in the print job received by the receiver; a job table registering and storing administrative information of the print job received by the receiver; a controller registering, upon reception of a print job by the receiver, administrative information of the print job received by the receiver in the job table, counting and storing the number of the registered print jobs, ordering the print processor to execute printing based on the registered print job, and adding information indicating that the printing is in progress to the administrative information of the print job on which the execution is ordered, inquiring of the print processor whether ejection of a recording medium corresponding to the print job on which the execution of printing is ordered from the print processor is completed, and deregistering from the job table the print job registered in the job table if an ejection completion response is made; a job cancellation inputter through which a job cancellation order for cancelling the printing of a print job in the process of printing is input; and a number-of-jobs-upon-cancel-operation storage storing the number of print jobs when a printing cancellation order is input from the job cancellation inputter, wherein the controller outputs an order to pause the ongoing printing to the print processor according to the job cancellation order input from the job cancellation inputter; the print processor completes the ordered pause of printing and makes a response indicating the completion of pause of printing to the controller; and the controller compares the number of print jobs registered in the job table as in the process of printing with the number stored in the number-of-jobs-upon-cancel-operation storage, and cancels the printing of the print job in the process of printing when the number of registered print jobs and the stored number are equal in spite of time difference between the time the job cancellation inputter received the job cancellation order and the time the print processor received the response indicating the completion of pause of printing.

The printing method according to a third exemplary aspect of the present invention is a printing method in a printing device including a receiver receiving a print job sent from a host device; a print processor executing printing on at least one or more recording media based on print data included in the print job received by the receiver; and a job table registering and storing administrative information of the print job received by the receiver, wherein upon reception of a print job by the receiver, administrative information of the print job received by the receiver is registered in the job table, and the print processor is ordered to execute printing based on the registered print job, information indicating that the printing is in progress is added to the administrative information of the print job on which the execution is ordered, the print processor is inquired whether ejection of a recording medium corresponding to the print job on which the execution of printing is ordered from the print processor is completed, the print job registered in the job table is deregistered from the job table if an ejection completion response is made, "a job cancellation order for cancelling the printing of a print job in the process of printing" input from a job cancellation inputter is received, the ID of the print job in the process of printing when a printing cancellation order is input from the job cancellation inputter is stored in a job-ID-upon-cancel-operation storage, an order to pause the ongoing printing is output to the print processor according to the job cancellation order input from the job cancellation inputter, the print processor completes the ordered pause of printing and makes a response indicating the completion of pause of printing to the controller, the ID of the print job registered in the job table as in the process of printing is compared with the ID stored in the job-ID-upon-cancel-operation storage, and the printing of the print job having the print job ID is cancelled when the ID of the registered print job and the stored ID are equal in spite of time difference between the time the job cancellation inputter received the job cancellation order and the time the print processor received the response indicating the completion of pause of printing.

The printing method according to a fourth exemplary aspect of the present invention is a printing method in a printing device including a receiver receiving a print job sent from a host device; a print processor executing printing on at least one or more recording media based on print data included in the print job received by the receiver; and a job table registering and storing administrative information of the print job received by the receiver, wherein upon reception of a print job by the receiver, administrative information of the print job received by the receiver is registered in the job table, the number of the registered print jobs is counted and stored, the print processor is ordered to execute printing based on the registered print job, information indicating that the printing is in progress is added to the administrative information of the print job on which the execution is ordered, the print processor is inquired whether ejection of a recording medium corresponding to the print job on which the execution of printing is ordered from the print processor is completed, the print job registered in the job table is deregistered from the job table if an ejection completion response is made, the administrative information of the next print job registered and stored is updated to in the process of printing, the print processor is ordered to execute the printing of the updated print job, a job cancellation order for cancelling the printing of a print job in the process of printing input from a job cancellation inputter is received, the number of print jobs when there is a printing cancellation order from the job cancellation inputter is stored in a number-of-jobs-upon-cancel-operation storage, an order to pause the ongoing printing is output to the print processor according to the job cancellation order input from the job cancellation inputter, the print processor completes the ordered pause of printing and makes a response indicating the completion of pause of printing to the controller, and the controller compares the number of print jobs registered in the job table as in the process of printing with the number stored in the number-of-jobs-upon-cancel-operation storage, and cancels the printing of the print job in the process of printing when the number of registered print jobs and the stored number are equal in spite of time difference between the time the job cancellation inputter received the job cancellation order and the time the print processor received the response indicating the completion of pause of printing.

The non-transitory storage medium according to a fifth exemplary aspect of the present invention is a storage medium storing a program for a computer to realize a printing method of cancelling printing of a print job received from a host device, executing a process to receive a print job sent from the host device by mean of a receiver; a process to make print on at least one or more recording media based on print data included in the print job received by the receiver; a process to register, upon reception of a print job by the receiver, administrative information of the print job received by the receiver in a job table, and order the print processor to execute printing based on the registered print job, and add information on the printing being in progress to the administrative information of the print job on which the execution is ordered; a process to inquire of the print processor whether ejection of a recording medium corresponding to the print job on which the execution of printing is ordered from the print processor is completed, deregister from the job table the print job registered in the job table if an ejection completion response is made, update the administrative information of the next print job registered and stored to in the process of printing, and order the print processor to execute the printing of the updated print job; a process to receive a job cancellation order for cancelling the printing of a print job in the process of printing input from a job cancellation inputter; and a process to store the ID of the print job in the process of printing when there is a printing cancellation order from the job cancellation inputter in a job-ID-upon-cancel-operation storage, and allowing the computer to further execute a process in which an order to pause the ongoing printing is output to the print processor according to the job cancellation order input from the job cancellation inputter; the print processor completes the ordered pause of printing and makes a response indicating the completion of pause of printing to the controller; and the ID of the print job registered in the job table as in the process of printing is compared with the ID stored in the job-ID-upon-cancel-operation storage, and the printing of the print job having the print job ID is cancelled when the ID of the registered print job and the stored ID are equal in spite of time difference between the time the job cancellation inputter received the job cancellation order and the time the print processor received the response indicating the completion of pause of printing.

The non-transitory storage medium according to a sixth exemplary aspect of the present invention is a storage medium storing a program for a computer to realize a printing method of cancelling printing of a print job received from a host device, executing a process to receive a print job sent from the host device by means of a receiver; a process to make print on at least one or more recording media based on print data included in the print job received by the receiver; a process to register, upon reception of a print job by the receiver, administrative information of the print job received by the receiver in a job table, count the number of the registered print jobs, order execution of printing, and add information on the printing being in progress to the administrative information of the print job on which the execution is ordered; a process to inquire of the print processor whether ejection of a recording medium corresponding to the print job on which the execution of printing is ordered from the print processor is completed, deregister from the job table the print job registered in the job table if an ejection completion response is made, update the administrative information of the next print job registered and stored to in the process of printing, and order the print processor to execute the printing of the updated print job; a process to receive a job cancellation order for cancelling the printing of a print job in the process of printing from a job cancellation inputter; and a process to store the number of print jobs when there is a printing cancellation order from the job cancellation inputter in a number-of-jobs-upon-cancel-operation storage, and allowing the computer to further execute a process in which an order to pause the ongoing printing is output to the print processor according to the job cancellation order input from the job cancellation inputter; the print processor completes the ordered pause of printing and makes a response indicating the completion of pause of printing to the controller; and the number of print jobs registered in the job table as in the process of printing is compared with the number stored in the number-of-jobs-upon-cancel-operation storage, and the printing of the print job in the process of printing is cancelled when the number of registered print jobs and the stored number are equal in spite of time difference between the time the job cancellation inputter received the job cancellation order and the time the print processor received the response indicating the completion of pause of printing.

The present invention stores information on the job ID upon cancel operation when a job cancellation order is made, makes comparison with the job ID upon cancel operation in executing print job cancellation, and if they match, executes the job cancellation without further operation on the operation button, whereby job cancellation is executed without complicate operation. Furthermore, the present invention stores information on the number of jobs upon cancel operation, makes comparison with the number of print jobs upon execution of cancellation, and if they match, executes the job cancellation without further operation on the operation button, whereby job cancellation is executed without complicate operation.

BRIEF DESCRIPTION OF THE DRAWINGS

A more complete understanding of this application can be obtained when the following detailed description is considered in conjunction with the following drawings, in which:

FIG. 2 is an illustration showing the job table structure;

FIG. 3 is an illustration showing the conceptual relationship between the print queue state and print queue table;

FIG. 4 is an illustration showing the print queue table structure;

FIG. 5 is an illustration showing the data structure on the number of created print queues, writing position, and reading positions in the initial state;

FIG. 6 is an illustration showing an exemplary job table storing specific data;

FIG. 7 is an illustration showing an exemplary print queue table storing specific data;

FIG. 8 is an illustration showing the data structure on the number of created print queues, writing position, and reading positions;

DETAILED DESCRIPTION

Embodiments of the present invention will be described hereafter with reference to the drawings.

Figure 1:
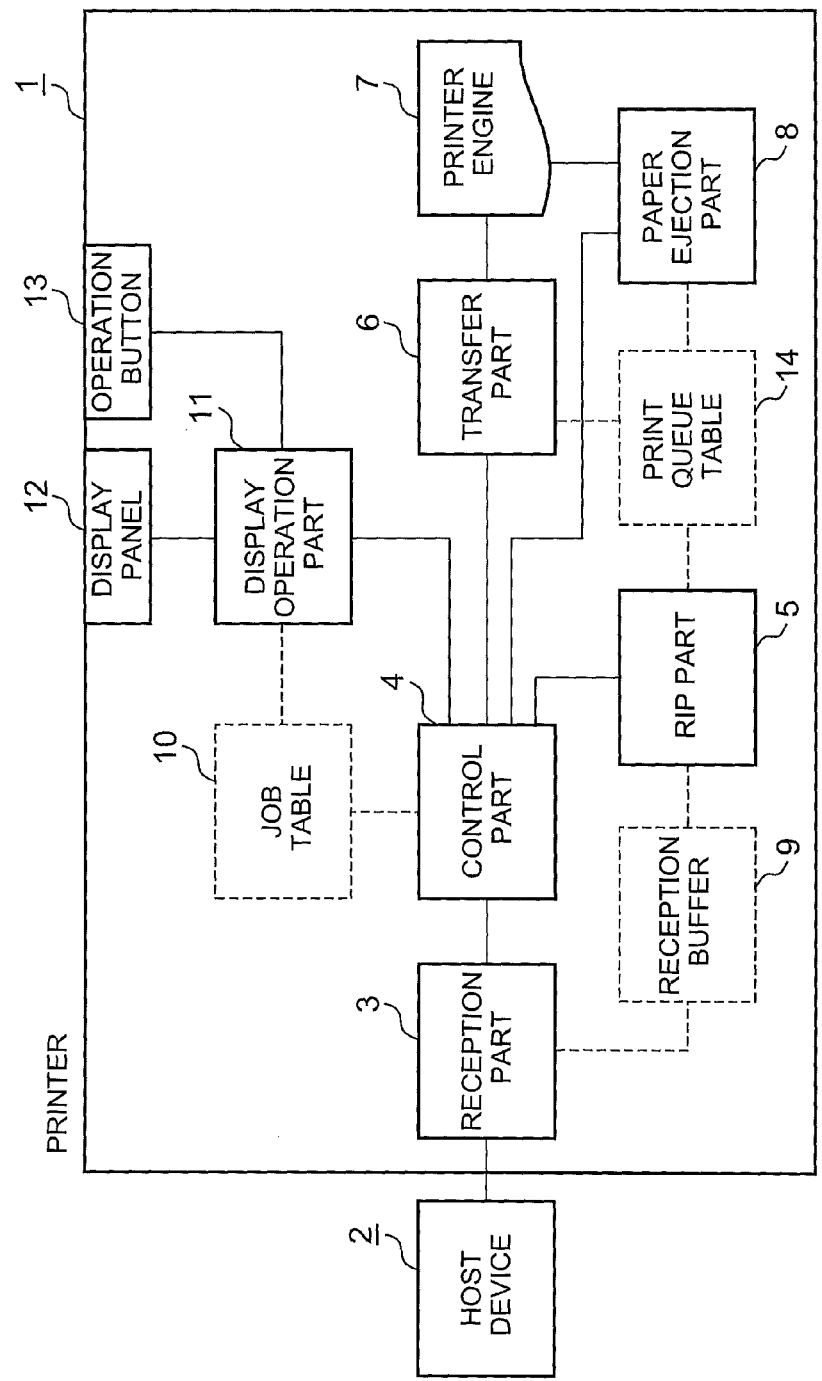
FIG. 1 is an illustration showing the basic system configuration of the embodiment.

FIG. 1 is an illustration showing the basic system of this embodiment. In the figure, a printer 1 is connected to a host device 2 such as a personal computer (PC) via a network such as a LAN (local area network). The printer 1 is composed of a reception part 3, a control part 4, a RIP part 5, a transfer part 6, a printer engine (print processor) 7, a paper ejection part (print processor) 8, a reception buffer 9, a job table 10, a display operation control part 11, a display panel 12, and an operation button (job cancellation inputter) 13. The RIP (raster image processor) part 5 command-analyzes and converts print data to image data, and in doing so, creates and stores a print queue in a print queue table 14. The image data command-analyzed and created by the RIP part 5 are expanded in a not-shown image memory.

The host device 2 converts the print data created according to the application to print data (PDL (page description language) data) by means of the printer driver and sends them to the printer 1. The reception part 3 of the printer 1 receives the print data supplied from the host device 2 and notifies the control part 4 of information such as the job ID, document name, total number of print sheets included in the print data. Here, the print data further include information such as color/monochrome printing and double sided/single sided printing in addition to the above information. Furthermore, the reception part 3 writes the received print data in the reception buffer 9 in sequence.

Receiving the notice from the reception part 3, the control part 4 stores the above information in the job table 10. FIG. 2 is an illustration showing the structure of the job table 10. The job table 10 consists of storage areas "job ID," "document name," "total number of print sheets," "remaining number of print sheets," "reception buffer address," and "job status" under each record number. Information on the job ID, document name, and total number of print sheets is stored in the corresponding storage areas.

Here, the storage area "job ID" stores, for example, an identification code given to each print job, the storage area "document name" stores information on the document name of the job ID, and the storage area "total number of print sheets" stores the total number of pages of the print data. Furthermore, the storage area "remaining number of print sheets" stores the remaining number of print sheets calculated by subtracting the number of sheets ejected from the total number of print sheets of the corresponding print data.

Furthermore, the storage area "reception buffer address" stores information on the address in the reception buffer 9 where the corresponding print data are stored. Furthermore, the storage area "job status" stores the job status of the corresponding print job; the job status to be stored can be, for example, "receiving," "printing," or "in RIP (image data conversion in progress)."

Here, in the initial state of the job table 10, as shown in FIG. 2, the storage areas "job ID" are all reset to "empty," the storage areas "document name" are all reset to "none," the storage areas "total number of print sheets" are all reset to "0," the storage areas "remaining number of print sheets" are all reset to "−1," the storage areas "reception buffer address" are all reset to "0," and the storage areas "job status" are all reset to "none."

Receiving a reception start signal from the reception part 3, the control part 4 searches the job table 10 in sequence from the record number 1 and writes information of the job ID, document name, and total number of print sheets of the print data in the storage areas of the first record number of which the storage area "job ID" is "empty."

The RIP part 5 reads the print data from the reception buffer 9 according to instruction from the control part 4, and command-analyzes and converts them to image data. The image data converted by the RIP part 5 are expanded in a not-shown image memory. Furthermore, the print queue created concurrently is stored in the print queue table 14. FIG. 3 is a conceptual illustration of the print queue table 14 and FIG. 4 is an illustration showing the data structure of the print queue table 14.

The print queue table 14 consists of storage areas "job ID," "current page number," "image memory address," "drawing state," and "job cancelation information" under each record number.

The storage area "job ID" stores, for example, an identification code given to each print job as described above. Furthermore, the storage area "current page number" stores the page number in the process of RIP processing among the corresponding print data. Furthermore, the storage area "image memory address" stores information on the address of the image area where the image data of the corresponding page is expanded.

Furthermore, the storage area "drawing state" stores the progress of drawing processing on the corresponding print data, such as "drawing" and "drawing completed." Furthermore, the storage area "job cancellation information" stores information indicating that job cancellation is ordered.

Here, as shown in FIG. 4, in the initial state of the print queue table 14, the storage areas "job ID" are all reset to "empty," the storage areas "current page number" and "image memory address" are all reset to "0," and the storage areas "drawing state" and "job cancellation information" are all reset to "none."

Therefore, in the initial state, as shown in FIG. 5, the number of print queues created is "0," the new print queue writing position is "1" (the record number 1), the print queue reading position for transfer is also "1" (the record number 1), and the print queue reading position for paper ejection is also "1" (the record number 1).

Here, the transfer part 6 reads image data from the image memory and transfers the image data to the printer engine 7. The printer engine 7 outputs image data to a storage medium (for example, paper) based on the image data transferred from the transfer part 6. Furthermore, the paper ejection part 8 ejects the paper on which print is made by the printer engine 7 onto a not-shown paper tray and notifies the control part 4 that the paper is ejected.

Specific processing/operation with the above configuration will be described hereafter.

It is assumed in explaining the processing/operation of this embodiment that the job table 10 already has the information shown in FIG. 6 stored. For example, the storage areas under the record number 1 store print job information of which the "job ID" is "J0004," "document name" is "Price List," and "total number of print sheets" is "9" (nine sheets). The "job status" of this print job is currently "printing." The conversion to image data by the RIP part 5 has already been completed and the "remaining number of print sheets" is "7" (seven sheets).

Furthermore, the storage areas under the record number 2 store print job information of which the "job ID" is "J0005," "document name" is "Layout Diagram," and "total number of print sheets" is "1" (one sheet). The "job status" of this print job is also "printing." The conversion to image data by the RIP part 5 has already been completed and the "remaining number of print sheets" is "−1." No printout has been made.

On the other hand, the storage areas under the record number 3 store print job information of which the "job ID" is "J0006," "document name" is "Meeting Material," and "total number of print sheets" is "14" (14 sheets). The "job status" of this print job is "in RIP." The conversion to image data by the RIP part 5 has started and the print data remains in the reception buffer 9. More specifically, the print data are stored in the reception buffer 9 from the start address "0x8000A064" stored in the "reception buffer address."

Furthermore, the storage areas under the record number 4 store print job information of which the "job ID" is "J0007," "document name" is "Budget Proposal," and "total number of print sheets" is "5" (five sheets). The "job status" of this print job is "receiving"; the reception by the reception part 3 is in progress. More specifically, the print data are being stored in the reception buffer 9 from the start address "0x8000CB18" stored in the "reception buffer address."

Here, at the time of starting the processing of this embodiment, the other record (the record number 5) in the job table 10 is in the initial state.

Like the above job table 10, it is assumed that the print queue table 14 already has the data shown in FIG. 7 stored. For example, the storage areas under the record number 1 store information on the page 9 (the "current page number" is "9") of which the "Job ID" is "J0004." The image data of the page 9 has been drawn from the information in the "drawing state," and expanded in an image memory from the start address "0x8081012C" from the information in the "image memory address."

Furthermore, for example, the storage areas under the record number 2 store information on the page 1 (the "current page number" is "1") of which the "Job ID" is "J0005," which is completely drawn from the information in the "drawing state," and expanded in an image memory from the start address "0x80C10140" from the information in the "image memory address."

Furthermore, for example, the storage areas under the record numbers 3 to 7 store information on the pages 1 to 5 (the "current page number" is "1," "2,"..., and "5") of which the "Job ID" is "J0006." The pages 1 to 4 are completely drawn and the page 5 is currently in drawing from the information in the "drawing state." They are expanded in an image memory from the start address "0x81010154" from the information in the "image memory address."

Here, the storage areas under the record numbers 8 and 9 are not used. The storage areas under the record number 10 store information on the page 8 (the "current page number" is "8") of which the "job ID" is "J0004," which is completely drawn from the information in the "drawing state" and expanded in an image memory from the start address "0x80400118" from the information in the "image memory address."

Therefore, in the above state of the print queue table 14, as shown in FIG. 8, the number of print queues used is "8," the next writing position is "7" (the record number 7), the next reading position for transfer is "1" (the record number 1), and the next reading position for paper ejection is "10" (the record number 10).

Figure 9:
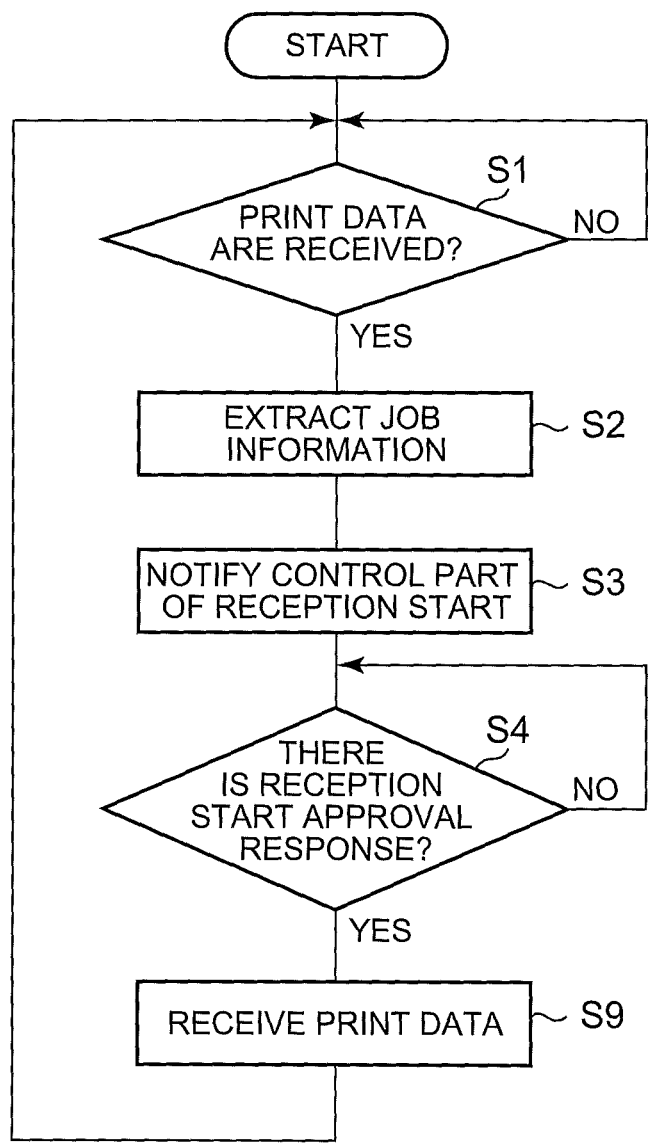
FIG. 9 is a flowchart for explaining the processing of the reception part upon regular printing.
Figure 10:
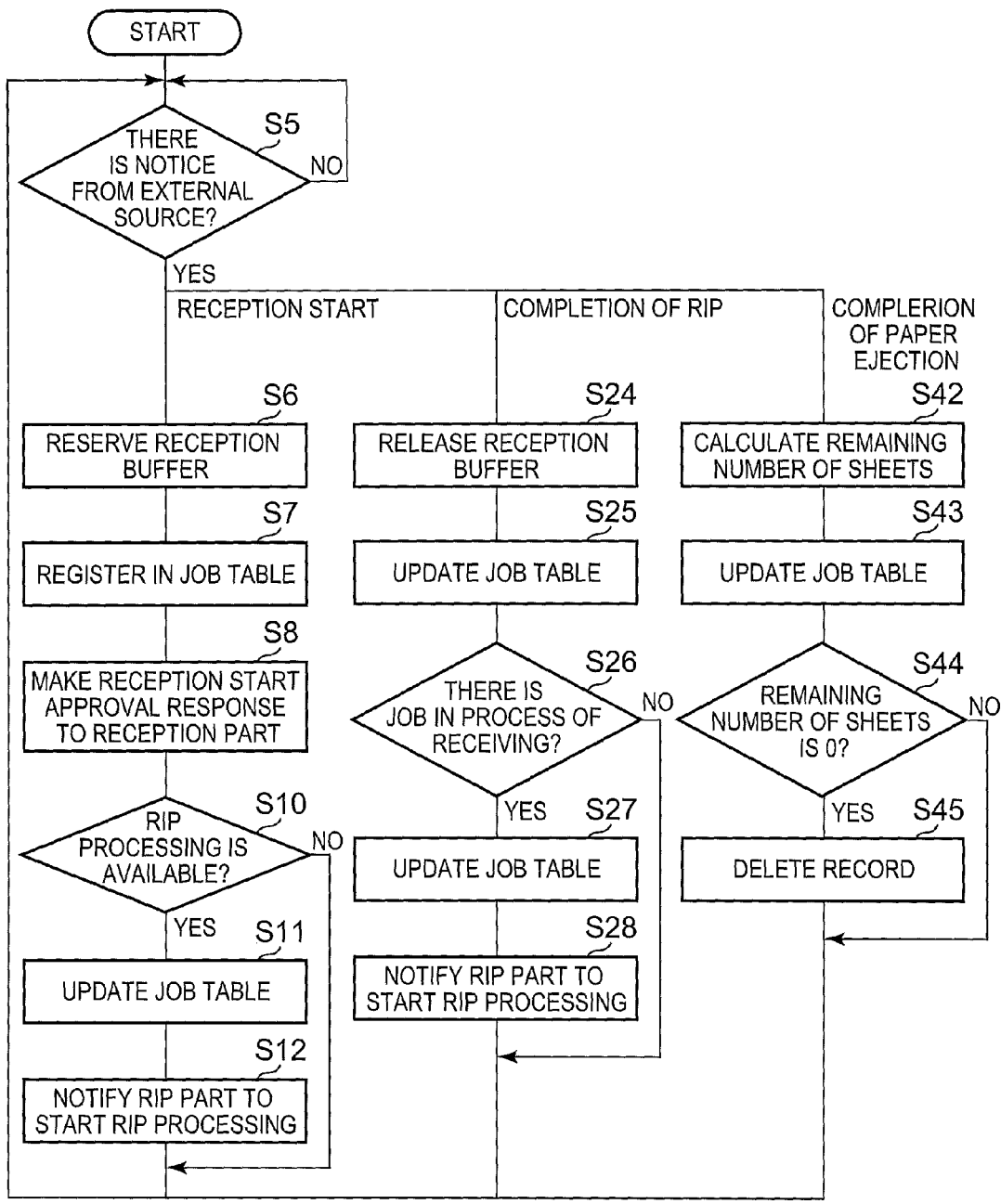
FIG. 10 is a flowchart for explaining the processing of the control part upon regular printing.
Figure 11:
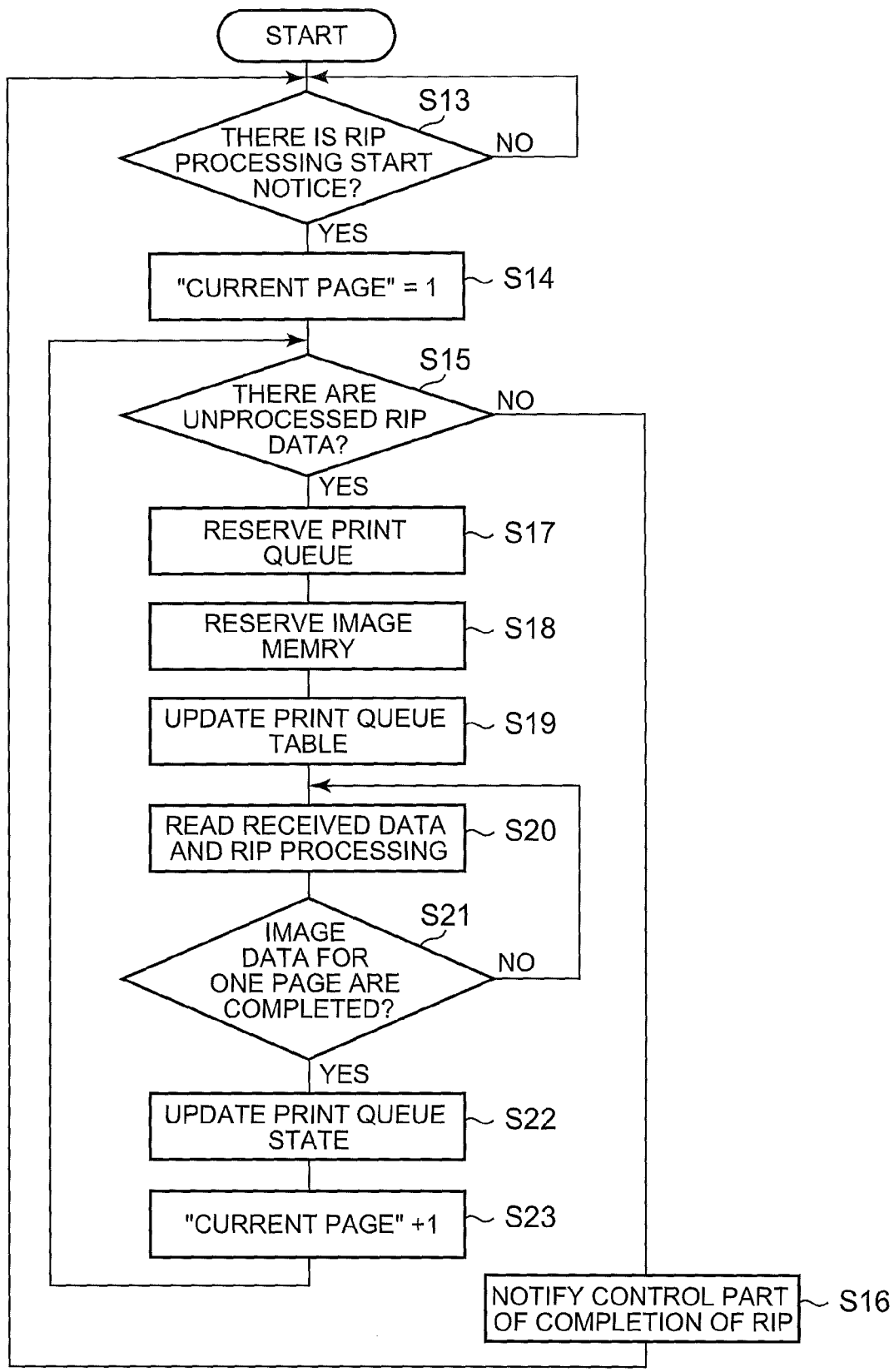
FIG. 11 is a flowchart for explaining the processing of the RIP part upon regular printing.
Figure 12:
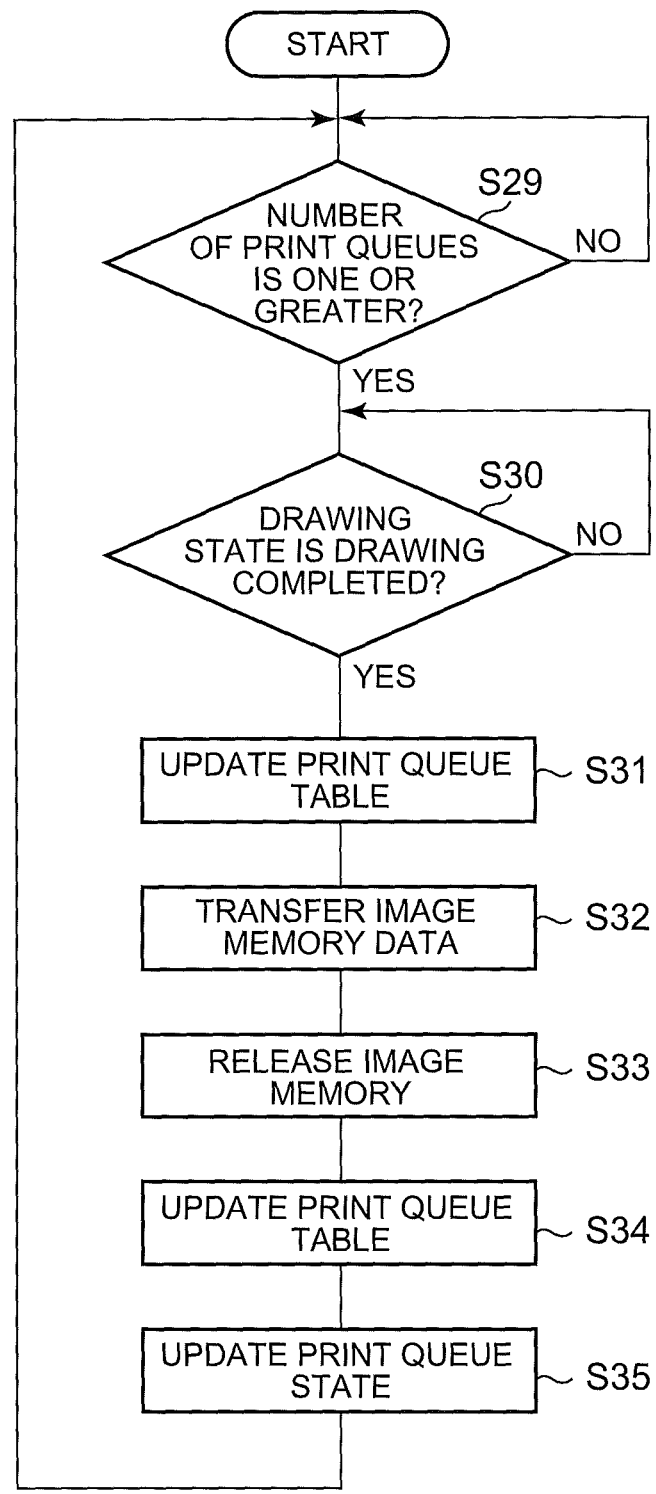
FIG. 12 is a flowchart for explaining the processing of the transfer part upon regular printing.
Figure 13:
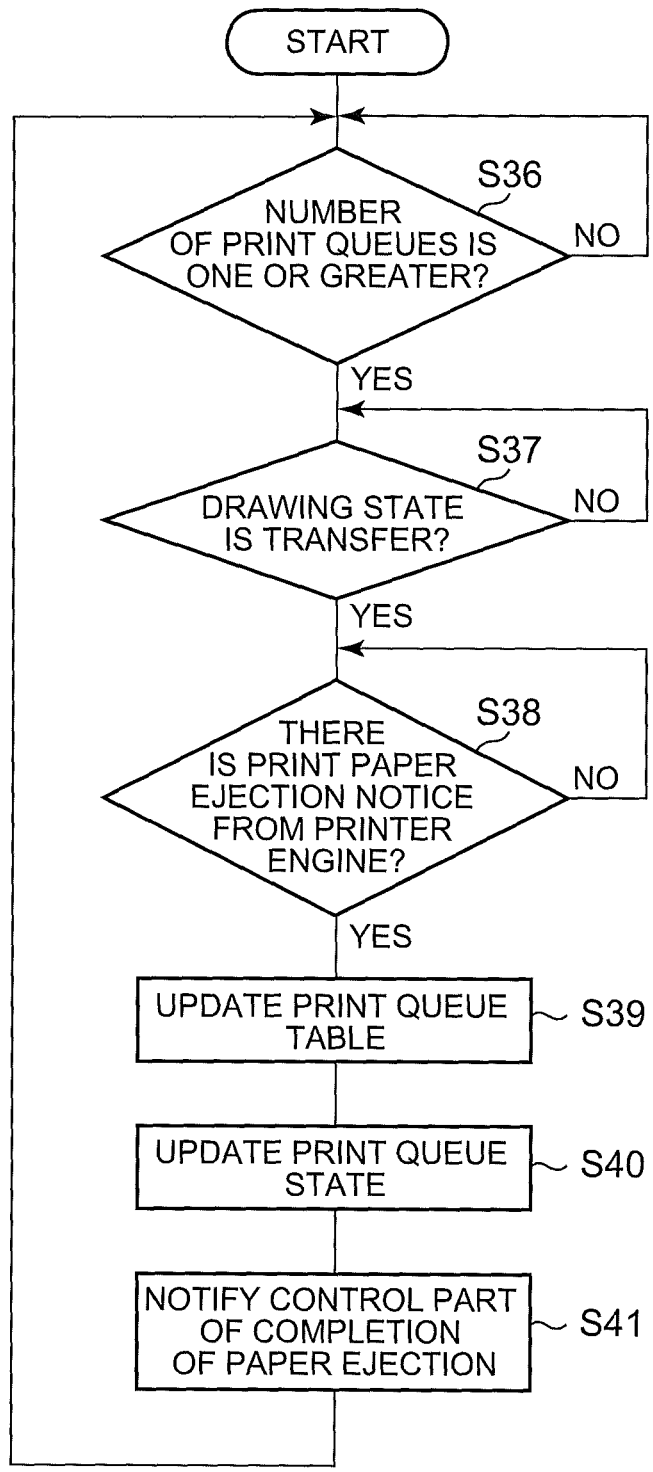
FIG. 13 is a flowchart for explaining the processing of the paper ejection part upon regular printing.

First, the regular printing procedure with no job cancellation order when the job table 10 and print queue table 14 are in the above-described states will be described. FIG. 9 is a flowchart for explaining the processing/operation of the reception part 3. FIG. 10 is a flowchart for explaining the processing/operation of the control part 4. FIG. 11 is a flowchart for explaining the processing/operation of the RIP part 5. FIG. 12 is a flowchart for explaining the processing/operation of the transfer part 6. FIG. 13 is a flowchart for explaining the processing/operation of the paper ejection part 8.

First, the reception part 3 determines whether print data are received from the host device 2 connected to the network (Step (abbreviated to S, hereafter) 1) according to the flowchart shown in FIG. 9. The reception part 3 waits until print data are received (NO in S1). Receiving print data (YES in S1), the reception part 3 extracts job information included in the print data (S2). This process is a process to extract information such as the aforementioned job ID, document name, and total number of print sheets included in the received print data.

Then, the reception part 3 notifies the control part 4 of print data reception start (S3). In other words, the reception part 3 outputs a reception start notice for obtaining approval for reception start to the control part 4 and waits for a reception start approval response from the control part 4 (S4).

Receiving the reception start notice from the reception part 3, the control part 4 starts the procedure according to the flowchart shown in FIG. 10 and first determines whether there is a notice from an external source (S5). In this case, receiving the reception start notice (YES in S5), the control part 4 makes reservation in the reception buffer 9 (S6) and conducts registration in the job table 10 (S7). In other words, the control part 4 reserves a storage area for the print data in the reception buffer 9 and registers the job information extracted from the print data in the job table 10.

Subsequently, the control part 4 makes a reception start approval response to the reception part 3 (S8). Receiving the reception start approval response from the control part 4 (YES in S4), the reception part 3 starts receiving print data and stores the input print data in the reception buffer 9 in sequence (S9).

After making a reception start approval response to the reception part 3, the control part 4 determines whether the RIP processing is available (S10). This determination is made with reference to the storage area "job status" in the job table 10 shown in FIG. 6. For example, in the case of information "in RIP" being stored under the record number 3, no RIP processing is conducted on new print data (NO in S10). On the other hand, in the case of the information "in RIP" not being stored in the storage area "job status" under any record number, the control part 4 updates the job table 10 (S11) and notifies the RIP part 5 to start RIP processing (S12). In such a case, the information "in RIP" is stored in the storage area "job status" under the record number on which the RPI processing starts.

Notified from the control part 4 to start RIP processing (YES in S13), the RIP part 5 sets the "current page" to 1 (S14) and determines whether there are any unprocessed RIP data (S15) according to the flowchart shown in FIG. 11. More specifically, the RIP part 5 determines whether there are any unread data (unprocessed RIP data). Here, if there are no unprocessed RIP data (NO in S15), the RIP part 5 notifies the control part 4 that the RIP processing is completed (S16). On the other hand, if there are any unprocessed RIP data (YES in S15), the RIP part 5 reserves a print queue (S17).

In the example shown in FIG. 6, the print job stored under the record number 4 is in the process of receiving. Then, a print queue is reserved, an image memory is also reserved (S18), the print queue table 14 is updated (S19), the print data are read from the reception buffer 9, and the RIP processing starts (S20). Then, it is determined whether image data for one page are completed (S21). If image data for one page are not completed (NO in S21), the RIP processing is repeated (S20 and S21).

Subsequently, if image data for one page are completed (YES in S21), the print queue table 14 is updated (S22) and the "current page" is incremented (+1) (S23). Then, it is determined whether there are any unprocessed RIP data (S15). It there are any unprocessed RIP data (YES in S15), the above processing (S17 to S23) is repeated. If there is no print data left in the reception buffer 9 (NO in S15), the control part 4 is notified that the RIP processing is completed (S16).

Receiving the RIP processing completion notice from the RIP part 5 (YES in S5), the control part 4 releases the reception buffer 9 (S24) and updates the job table 10 (S25).

For example, in the example shown in FIG. 6, receiving the notice of completion of RIP processing on the "job ID" of "J0006" under the record number 3, the control part 4 releases the storage area in the reception buffer 9 where the print data of the print job are stored and updates the "job status" to "printing." Furthermore, receiving the notice of completion of RIP processing on the "job ID" of "J0007" under the record number 4, the control part 4 releases the storage area in the reception buffer 9 where the print data of the print job are stored and updates the "job status" to "in RIP" and to "printing" in turn.

Then, it is determined whether there is any print job in the process of receiving (S26). If there is any print job in the process of receiving (YES in S26), the job table 10 is updated (S27) and the RIP part 5 is notified to start RIP processing (S28). For example, in the example shown in FIG. 6, as new print data are entered from the host device 2 and new print job information is entered in the available areas under the record number 5, the new print job information is written in the job table 10 and the RIP part 5 is notified to start RIP processing.

As print information is created in the print queue table 14 and one or more print queues are created (YES in S29), the transfer part 6 makes reference to the storage area "drawing state" in the print queue table shown in FIG. 7 and determines whether it is "drawing completed" (S30) according to the flowchart shown in FIG. 12. For example, in the example shown in FIG. 7, the storage area "drawing state" under the record numbers 1 to 6 is "drawing completed" (YES in S30); then, the print queue table 14 is updated so that the corresponding storage area "drawing state" is updated to "transfer" (S31). Then, the image data expanded in a not-shown image memory are transferred to the printer engine 7 (S32), and the printer engine 7 makes printout on paper based on the image data.

Subsequently, the transfer part 6 releases the image memory in which the corresponding image data are expanded (S33), updates the print queue table (S34), and updates the print queue state (S35).

On the other hand, as print information is created in the print queue table 14 and one or more print queues are created (YES in S36), the paper ejection part 8 makes reference to the storage area "drawing state" in the print queue table shown in FIG. 7 and determines whether it is set to "transfer" (S37) according to the flowchart shown in FIG. 13. For example, as the transfer part 6 starts transfer and there is a print queue having the storage area "drawing state" set to "transfer" (YES in S37), the paper ejection part 8 waits for a print paper ejection notice from the printer engine 7 (S38). Subsequently, as the printer engine 7 completes printout on paper and a print paper ejection notice is issued (YES in S38), the print queue table 14 is updated (S39), the print queue state is updated (S40), and the control part 4 is notified that the paper ejection is completed (S41).

Receiving the paper ejection completion notice from the paper ejection part 8 (YES in S5), the control part 4 calculates the remaining number of sheets (S42). This process is a process to calculate the remaining number of print sheets of the corresponding print job.

The data in the "remaining number of print sheets" shown in FIG. 6 are decremented (−1) and the corresponding storage area "remaining number of print sheets" is updated (S43). For example, for the print data having the "job ID" of "J0004" shown in FIG. 6, the current data in the storage area "remaining number of print sheets" are decremented by 1 so as to update to "6" from a current value "7."

Subsequently, it is determined whether the remaining number of sheets is 0 as a result of the above processing (S44). If the corresponding storage area "remaining number of print sheets" is "0" (YES in S44), the print job of the corresponding recording number is deleted (S45). For example, as the print data having the "job ID" of "J0004" shown in FIG. 6 are further transferred and the data in the storage area "remaining number of print sheets" become "0," the data of the print job of the record number 1 are deleted.

The regular printing procedure is described above. The printing procedure in which a job cancelation order is made will be described hereafter.

Figure 14:
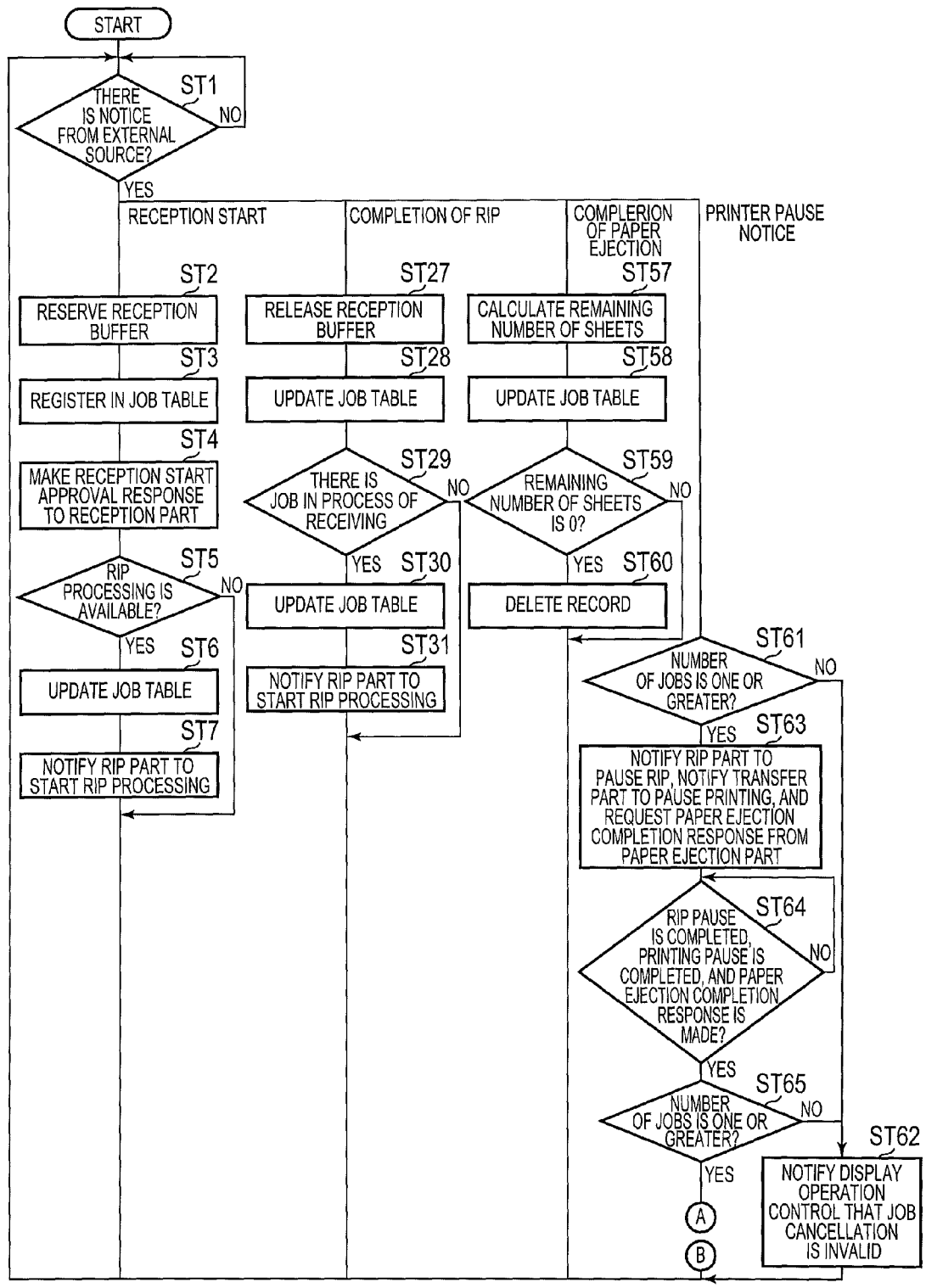
FIG. 14 is a flowchart of the control part for explaining the printing process including job cancellation.
Figure 15:
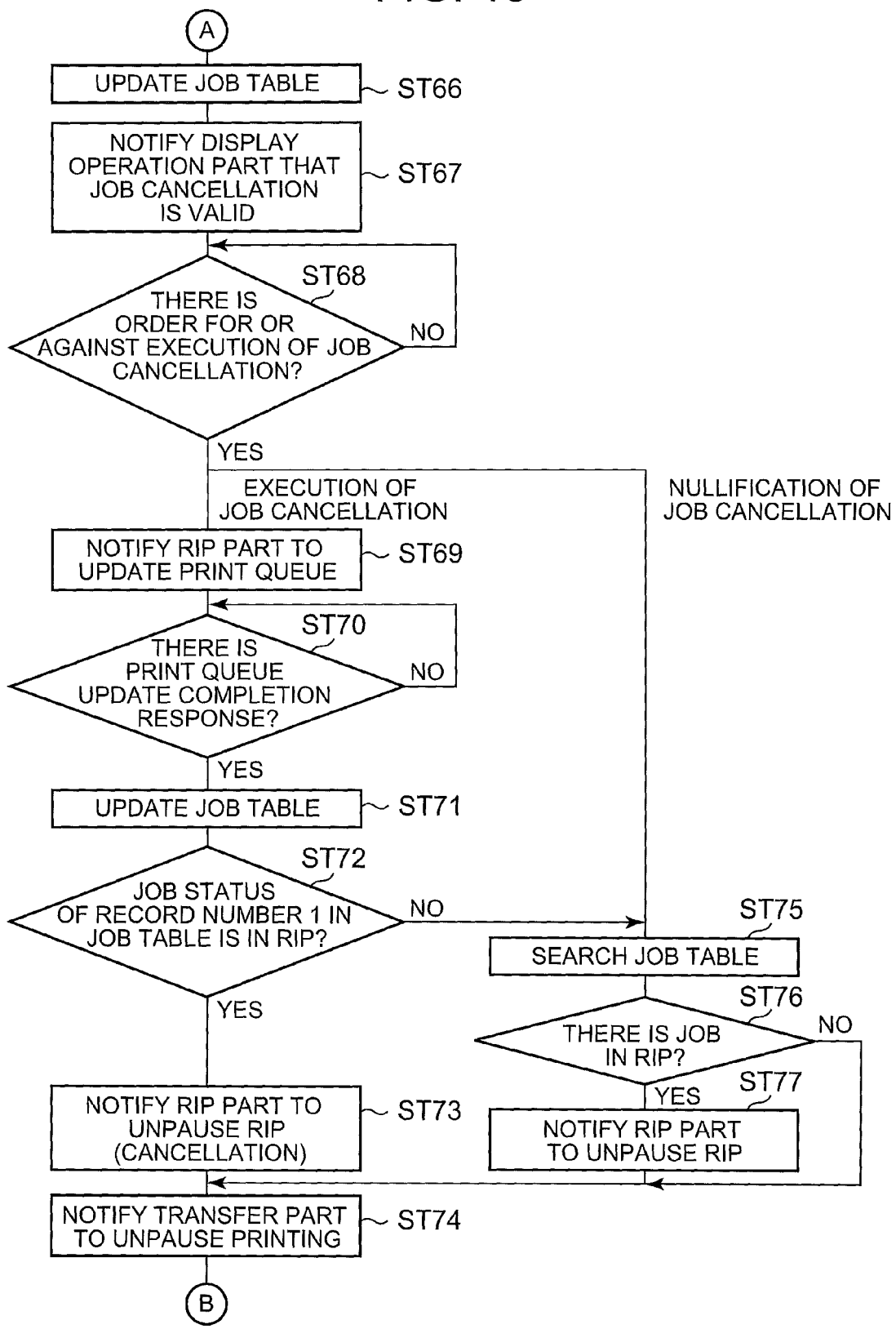
FIG. 15 is a flowchart of the control part for explaining the printing process including job cancellation.
Figure 16:
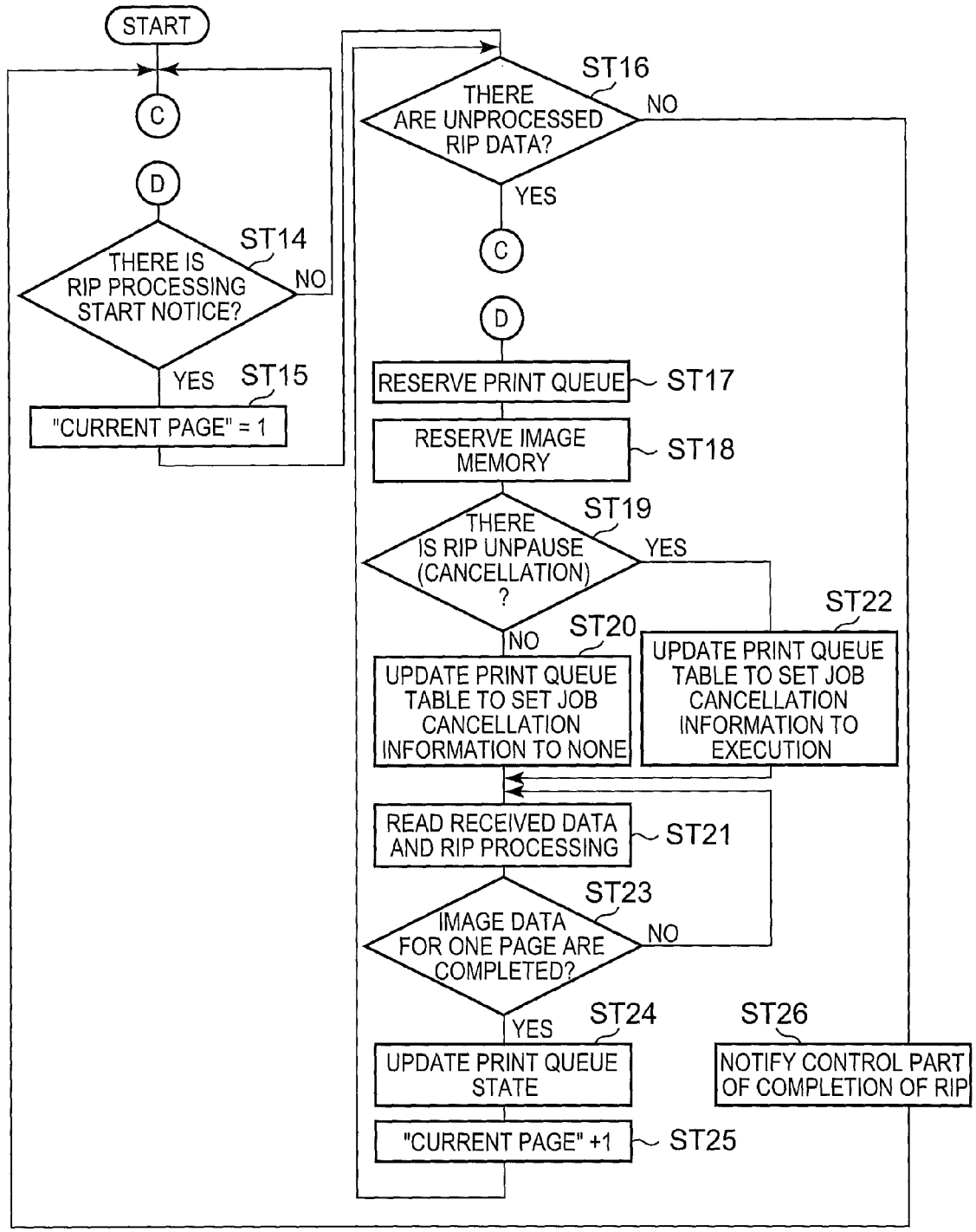
FIG. 16 is a flowchart of the RIP part for explaining the printing process including job cancellation.
Figure 17:
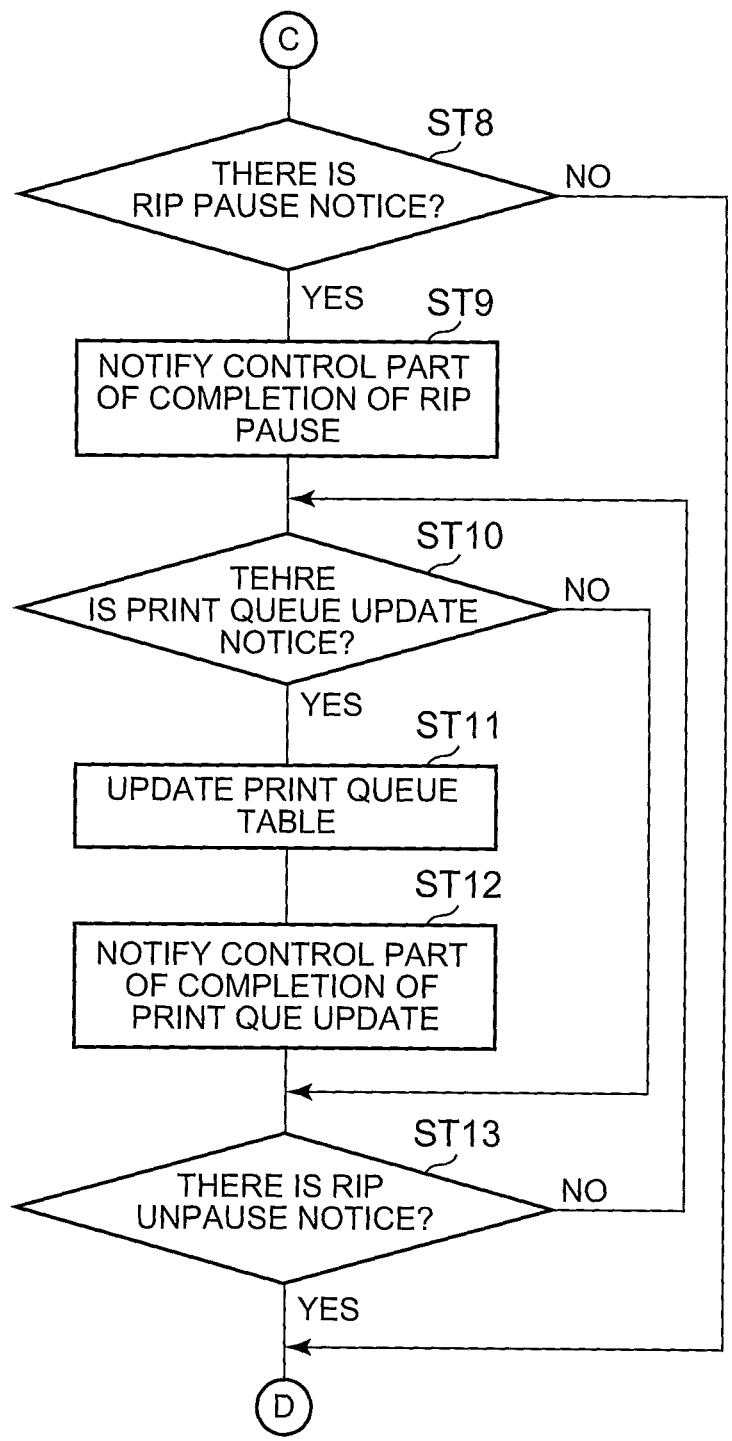
FIG. 17 is a flowchart of the RIP part for explaining the printing process including job cancellation.
Figure 18:
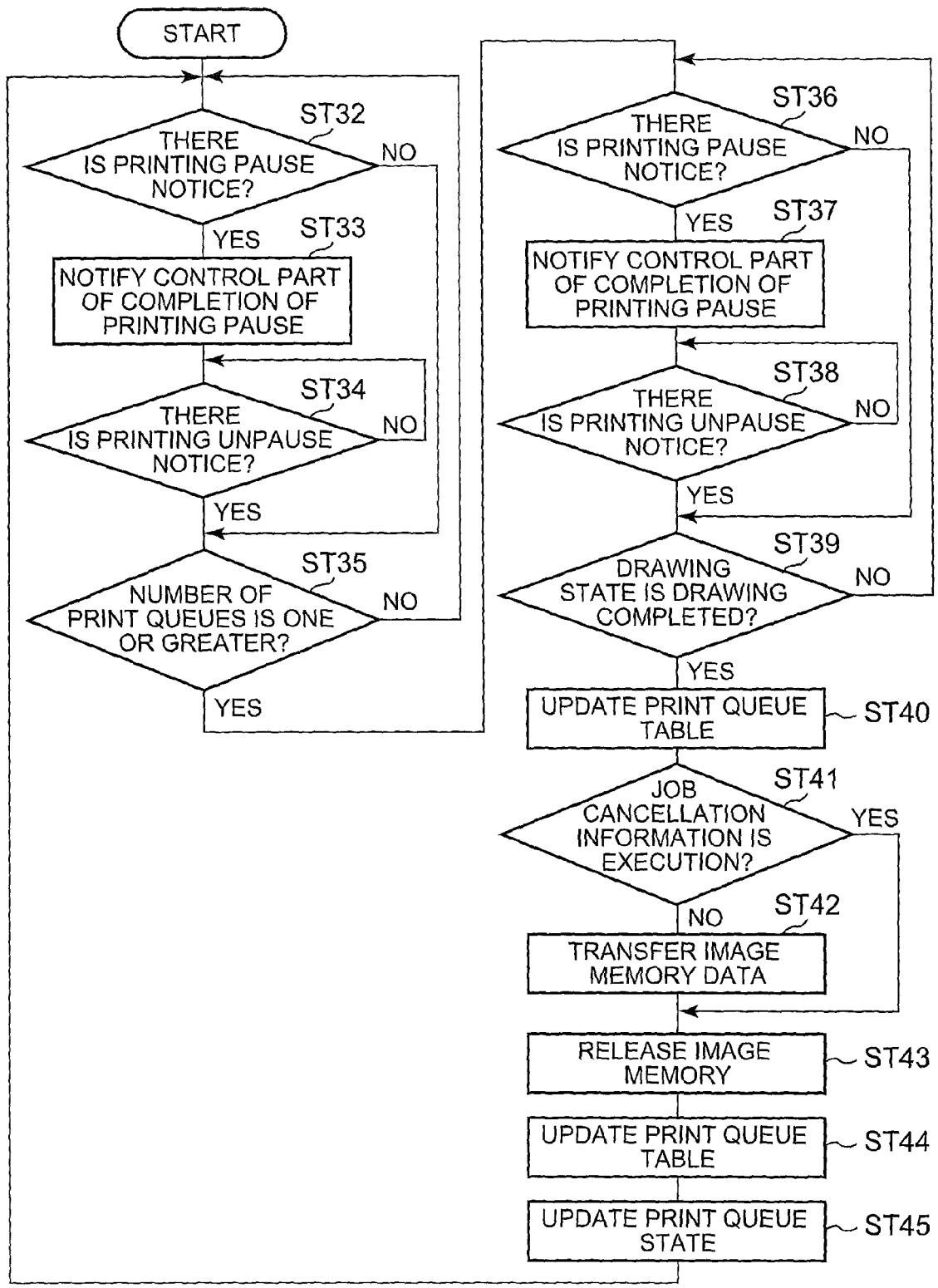
FIG. 18 is a flowchart of the transfer part for explaining the printing process including job cancellation.
Figure 19:
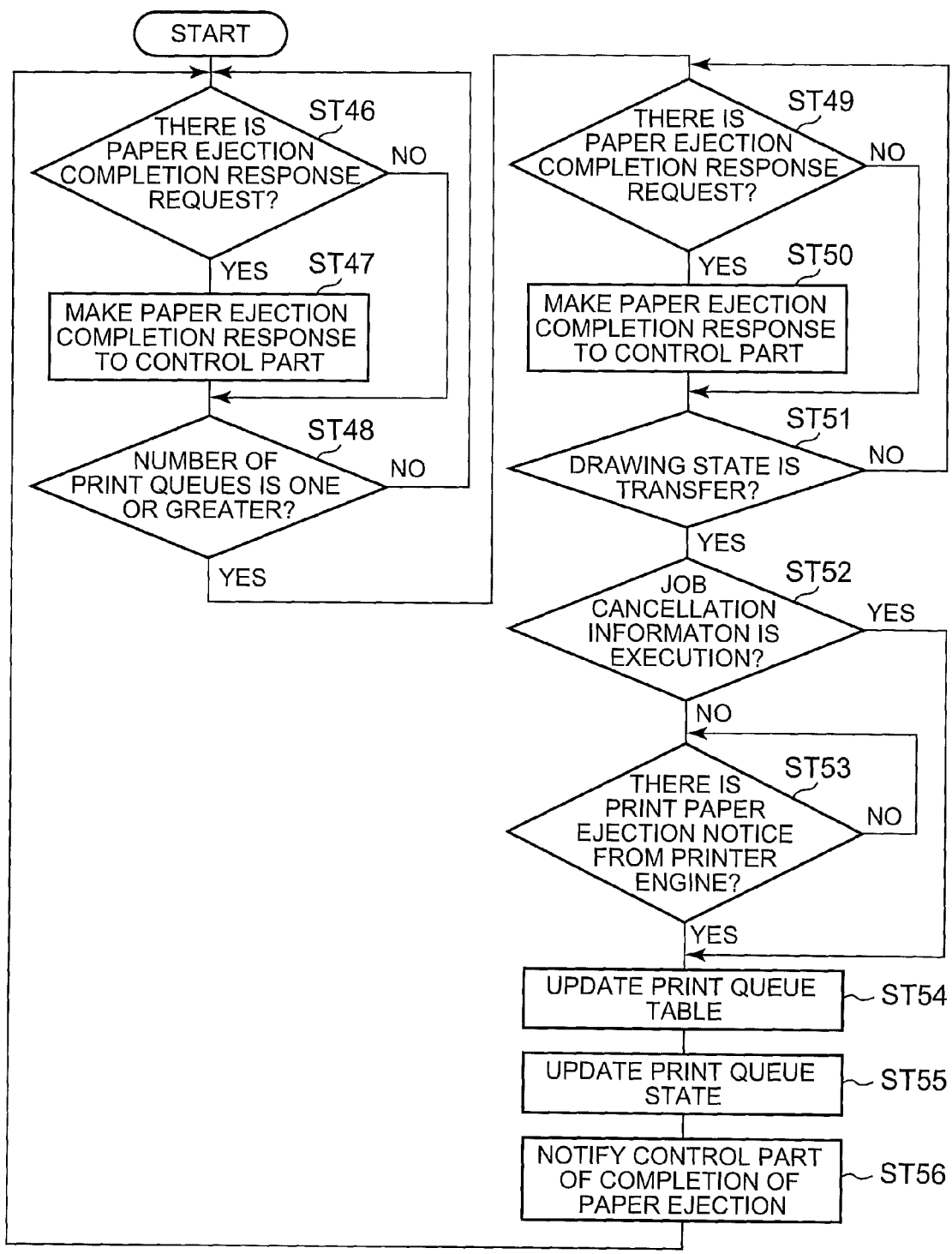
FIG. 19 is a flowchart of the paper ejection part for explaining the printing process including job cancellation.
Figure 20:
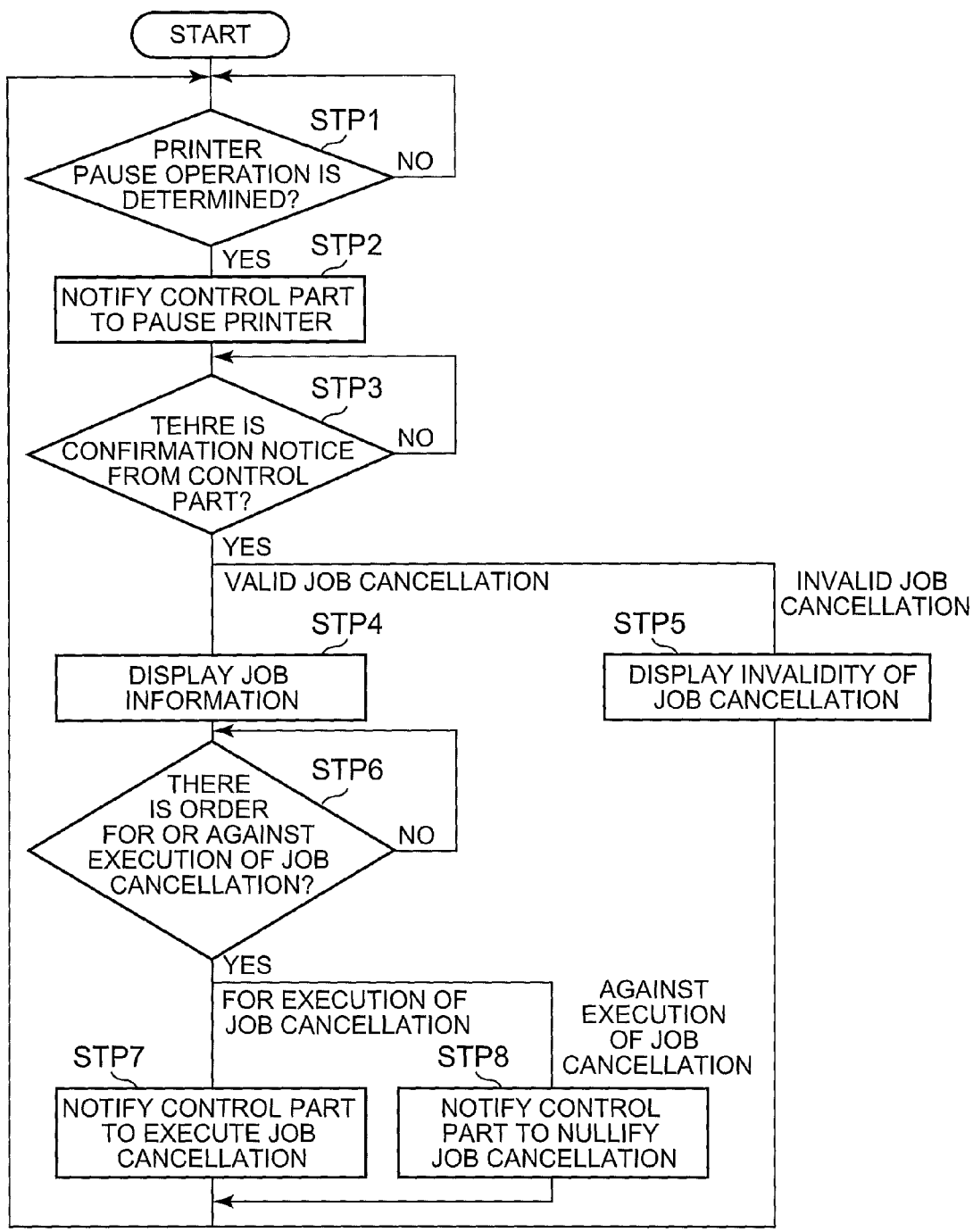
FIG. 20 is a flowchart for explaining the processing of the display operation control part.

FIGS. 14 and 15 are flowcharts for explaining the processing/operation of the control part 4. FIGS. 16 and 17 are flowcharts for explaining the processing/operation of the RIP part 5. FIG. 18 is a flowchart for explaining the processing/operation of the transfer part 6. FIG. 19 is a flowchart for explaining the processing/operation of the paper ejection part 8. FIG. 20 is a flowchart for explaining the processing/operation of the display operation control part 11.

Here, it is assumed again that the job table 10 has the print job information shown in FIG. 6 stored and the print queue table 14 has the print queue shown in FIG. 7 created.

As described above, the reception part 3 waits for reception of print data from the host device 2 connected to the network, extracts job information included in the print data upon receiving the print data, notifies the control part 4 of reception start, and waits for reception start approval from the control part 4.

Receiving the reception start notice from the reception part 3, the control part 4 first determines whether there is a notice from an external source (Step (abbreviated to ST, hereafter) 1) according to the flowchart shown in FIG. 14. Here, receiving the reception start notice, the control part 4 make reservation in the reception buffer 9 (ST2) and conducts registration in the job table 10 (ST3) as described above. In other words, the control part 4 reserves a storage area for the print data in the reception buffer 9 and registers the job information extracted from the print data in the job table 10.

Subsequently, the control part 4 makes a reception start approval response to the reception part 3 (ST4). Receiving the reception start approval response from the control part 4, the reception part 3 stores the print data in the reception buffer 9 in sequence.

After making a reception start approval response to the reception part 3, the control part 4 determines whether RIP processing is available (ST5). This determination is made with reference to the storage area "job status" in the job table 10 shown in FIG. 6 as described above. For example, in the case of information "in RIP" being stored under the record number 3, no RIP processing is conducted on new print data (NO in ST5). On the other hand, in the case of the information "in RIP" not being stored in the storage area "job status" under any record number, the control part 4 updates the job table 10 (ST6) and notifies the RIP part 5 to start RIP processing (ST7).

The RIP part 5 determines whether there is a RIP pause notice from the control part 4 (C in the flowchart shown in FIG. 16 and ST8 in the flowchart shown in FIG. 17). If there is a RIP pause notice (YES in ST8), the RIP part 5 pauses the RIP processing and notifies the control part 4 that the RIP pause is completed (ST9). The RIP pause notice is a notice output from the control part 4 when a job cancellation order described above is issued. The RIP part 5 pauses the ongoing RIP processing, conducts a series of processing described later (ST10 to ST12), and waits for a RIP unpause notice from the control part 4 (ST13).

Therefore, unless there is a RIP pause notice (unless a job cancellation order is issued), a RIP processing start notice from the control part 4 is waited (NO in ST8, ST14), and if a RIP processing start notice is issued (YES in ST14), the "current page" is set to 1 (ST15) and it is determined whether there are unprocessed RIP data (ST16) as described above. Here, if there are unprocessed RIP data (YES in ST16), it is confirmed again that there is no RIP pause notice (job cancellation order) (NO in ST8), the print queue table 14 is reserved (ST17), and the area of the image memory for expansion is reserved (ST18).

Subsequently, it is determined whether to unpause the RIP (ST19). If there is no RIP unpause (YES in ST19), the storage area "job cancellation information" of the print queue table 14 is set to "none" (is maintained "none") (ST20), the print data are read from the reception buffer 9, and the same RIP processing as described above is conducted (ST21 to ST25). Subsequently, after all unprocessed RIP data are converted to image data (NO in ST16), the control part 4 is notified that the RIP processing is completed (ST26).

On the other hand, receiving the RIP processing completion notice from the RIP part 5 (YES in ST1), the control part 4 releases the reception buffer 9 (ST27) and updates the job table 10 (ST28) as described above. Subsequently, the control part 4 determines whether there is a print job in the process of receiving (ST29). If there is a print job in the process of receiving (YES in ST29), the control part 4 updates the job table 10 (ST30) and notifies the RIP part 5 to start RIP processing (ST31).

The transfer part 6 determines whether there is a printing pause notice from the control part 4 (ST32). If there is a printing pause notice (YES in ST32), the transfer part 6 pauses the printing, notifies the control part 4 that the printing pause is completed (ST33), and waits for a printing unpause notice from the control part 4 (ST34). This printing pause notice is also a notice sent from the control part 4 when a job cancellation order described later is issued. If there is no printing pause notice, as described above, printing information is created in the print queue table 14 and if one or more print queues are created (YES in ST35), it is confirmed again that there is no printing pause notice from the control part 4 (NO in ST36) and the storage area "drawing state" shown in FIG. 7 is referred to determine whether it is set to the "drawing completed" (ST39), which is followed by the same processing as described above (ST40 to ST45).

The paper ejection part 8 determines whether a paper ejection completion response request is made by the control part 4 (ST46). If a paper ejection completion response request is made (YES in ST46), the paper ejection part 8 makes a paper ejection completion response to the control part 4 (ST47). This paper ejection completion response request is made when a job cancellation order described later is issued. If no paper ejection completion response request is made, as described above, print information is created in the print queue table 14 and if one or more print queues are created (YES in ST48), it is confirmed again that no paper ejection completion response request is made by the control part 4 (NO in ST 49), and the storage area "drawing state" shown in FIG. 7 is referred to determine whether it is set to "transfer" (ST51). Then, it is confirmed whether the storage area "job cancellation information" is not set to "execution" (ST52).

Then, as described above, a print paper ejection notice from the printer engine 7 is waited (ST53). If there is a print paper ejection notice (YES in ST53), the print queue table 14 is updated (ST54), the print queue state is updated (ST55), and the control part 4 is notified that the paper ejection is completed (ST56) as described above.

Receiving the paper ejection completion notice from the paper ejection part 8 (YES in ST1), the control part 4 calculates the remaining number of sheets (ST57), updates the job table 10 (ST58), and determines whether the remaining number of print sheets is 0 (ST59) as described above. Then, if the storage area "remaining number of print sheets" is "0" (YES in ST59), the control part 4 deletes the print job of the corresponding record number (ST60).

On the other hand, if the user operates on the operation button (job cancellation inputter) 13 to issue a job cancellation order during the above processing, an operation signal is sent to the display operation control part 11.

FIG. 20 is a flowchart for explaining the processing of the display operation control part 11. First, the display operation control part 11 determines whether there is a printer pause operation (Step (abbreviated to STP in FIG. 20, hereafter) 1). In other words, the display operation control part 11 receives an operation signal based on operation on the operation button (job cancellation inputter) 13, acknowledges a job cancellation order, and determines that there is a printer pause operation (YES in STP1). Then, the display operation control part 11 notifies the control part 4 to pause the printer based on the determination (STP2).

Receiving the printer pause notice (YES in ST1), the control part 4 determines whether the number of print jobs is 1 or greater (ST61). If the number of print jobs is not 1 or greater (NO in ST61), in other words if the number of print jobs is "0," there is no point of job cancellation and the control part 4 notifies the display operation control part 11 that the job cancellation is invalid (ST62). The display operation control part 11 displays invalidity of the job cancellation based on the notification from the control part 4 (STP5).

On the other hand, if the number of print jobs is one or greater (YES in ST61), the control part 4 notifies the RIP part 5 to pause the RIP processing, notifies the transfer part 6 to pause the printing, and requires a paper ejection completion response from the paper ejection part 8 (ST63).

Receiving the notice (YES in ST8), the RIP part 5 pauses the ongoing RIP processing and notifies the control part 4 that the RIP pause is completed (ST9) as described above. Subsequently, the RIP part 5 waits for a RIP unpause notice from the control part 4 (ST13).

Furthermore, receiving the printing pause notice from control part 4 (YES in ST32 or YES in ST36), the transfer part 6 pauses the image data transfer and notifies the control part 4 that the printing pause is completed (ST33 or ST37). Subsequently, the transfer part 6 waits for a printing unpause notice from the control part 4 (ST34 or ST38).

Furthermore, receiving the paper ejection completion response request from the control part 4 (YES in ST46 or YES in ST49), the paper ejection part 8 confirms the print paper ejected and makes a paper ejection completion response to the control part 4 (ST47 or ST50).

Receiving the above RIP pause completion response from the RIP part 5, printing pause completion response from the transfer part 6, and paper ejection completion response from the paper ejection part 8 (YES in ST64), the control part 4 determines again whether the number of print jobs is one or greater (ST65). If the number of print jobs is one or greater (YES in ST65), the control part 4 updates the job table 10 (ST66), and notifies the display operation control part 11 that the job cancellation is valid (ST67). Here, it is determined again whether the number of print jobs is one or greater because the print job to be cancelled may be completed while the RIP part 5 executes the RIP pause procedure or the transfer part 6 executes the printing pause procedure.

Notified from the control part 4 that the job cancellation is valid, the display operation control part 11 displays the job information on the display panel 12 (STP4), and waits for an order for or against execution of the job cancellation (STP6). In this case, the display operation control part 11 displays information of the document name of the print job under the record number 1 that is in the process of printing on the display panel 12, and waits for an order to execute the job cancellation or an order to nullify the job cancellation from the user.

Subsequently, if the operation button 13 is operated and an order to execute the job cancellation is issued (YES in STP6), the display operation control part 11 notifies the control part 4 to execute the job cancellation (STP7). On the other hand, if an order to nullify the job cancellation is issued (NO in STP6), the display operation control part 11 notifies the control part 4 of nullify the job cancellation (STP8).

Notified from the display operation control part 11 to execute the job cancellation (YES in ST68), the control part 4 notifies the RIP part 5 to update the print queue (ST69). Receiving the print queue update notice (ST10), the RIP part 5 updates the print queue table 14 (ST11).

Subsequently, the RIP part 5 notifies the control part 4 that the print queue update is completed (ST12). Receiving the print queue update completion notice (YES in ST70), the control part 4 further updates the job table 10 (ST71). For example, the control part 4 clears the information under the record number 1 of the print job of the document name "Price List" of the "J0004" and moves up the record numbers one by one.

Then, it is determined whether the "job status" under the record number 1 in the job table 10 is "in RIP" (ST72). In this case, the print job information updated in the above processing is stored in the storage areas under the record number 1. If the "job status" of the print job stored under the record number 1 is in RIP (YES in ST72), the RIP part 5 is notified to unpause the RIP (ST73) and the transfer part 6 is notified to unpause the printing (STP74).

On the other hand, if the "job status" under the record number 1 is not in RIP (NO in ST72), the job table 10 is searched (S75). If there is any print job of which the "job status" is in RIP (YES in ST76), the RIP part 5 is notified to unpause the RIP (ST77) and the transfer part 6 is notified to unpause the printing (ST74).

With the above processing, the RIP processing and image data transfer of the print job under the record number 1 after the job cancellation procedure are conducted. In this case, the RIP part 5 updates the print queue table 14 based on the RIP unpause notice (YES in ST19), and sets the storage area "job cancellation information" of the corresponding print job to execution (ST22).

On the other hand, for the print job to be cancelled, the transfer part 6 releases the image data in the image memory (ST43) without transferring the image data of the print job from the image memory (YES in ST41).

Furthermore, for the print job to be cancelled, the paper ejection part 8 notifies the control part 4 that the paper ejection is completed (ST54 to ST56) without waiting for a print paper ejection notice from the printer engine 7 (YES in ST52).

The above processing is the basic processing to execute job cancellation. Embodiment 1 of this embodiment will be described hereafter.

Figure 21:
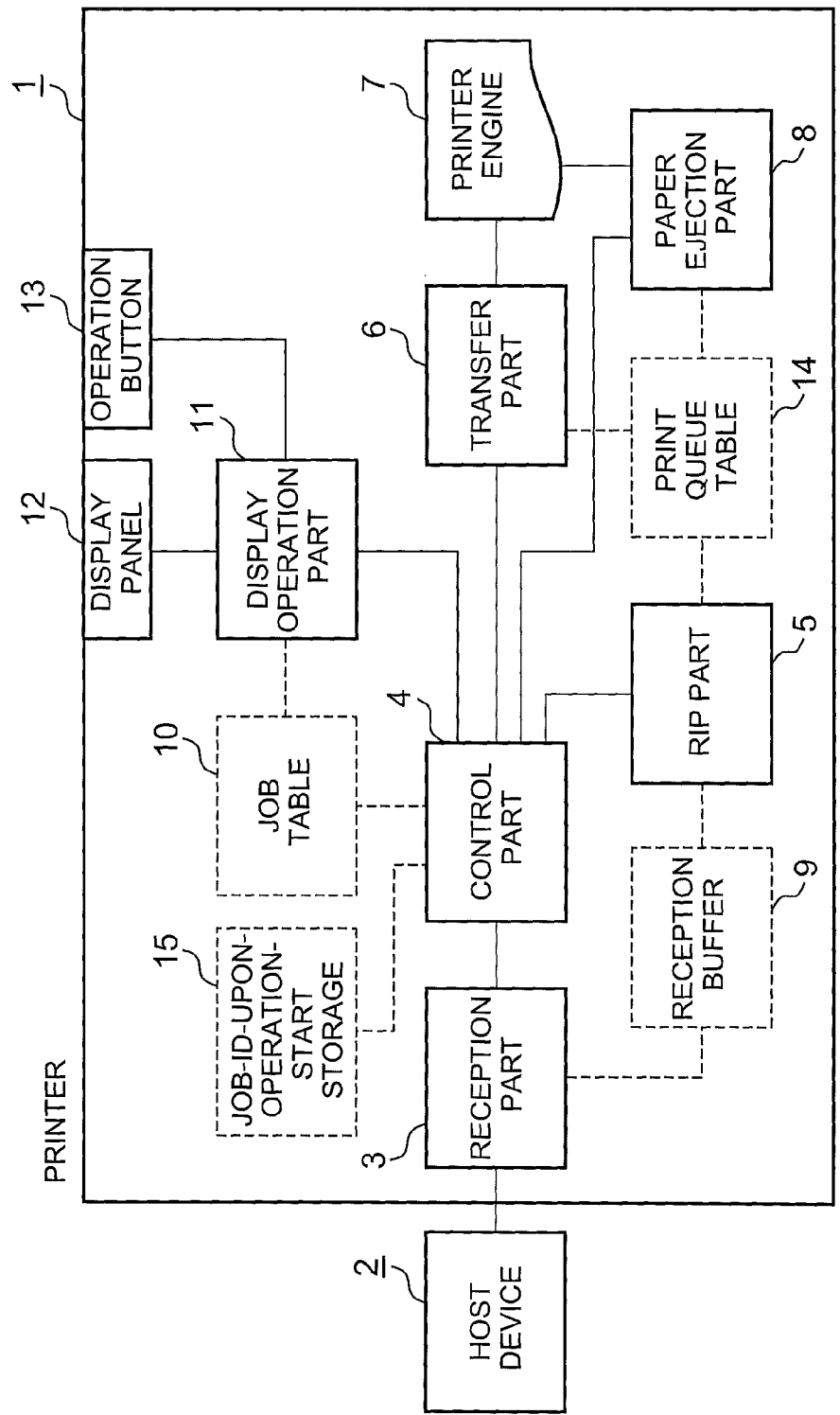
FIG. 21 is an illustration showing the system configuration of Embodiment 1.

FIG. 21 is an illustration showing the system configuration of this embodiment, which is basically the same as the system configuration described with reference to FIG. 1 except that a job-ID-upon-cancel-operation storage 15 is added. In other words, the printer 1 is connected to the host device 2 via a network such as a LAN, and composed of the reception part 3, control part 4, RIP part 5, transfer part 6, printer engine 7, paper ejection part 8, reception buffer 9, job table 10, display operation control part 11, display panel 12, operation button 13, print queue table 14, and job-ID-upon-cancel-operation storage 15. The job-ID-upon-cancel-operation storage 15 stores information on the print job ID when the operation button 13 is operated for (operation for) job cancellation. Details will be given hereafter.

Figure 22:
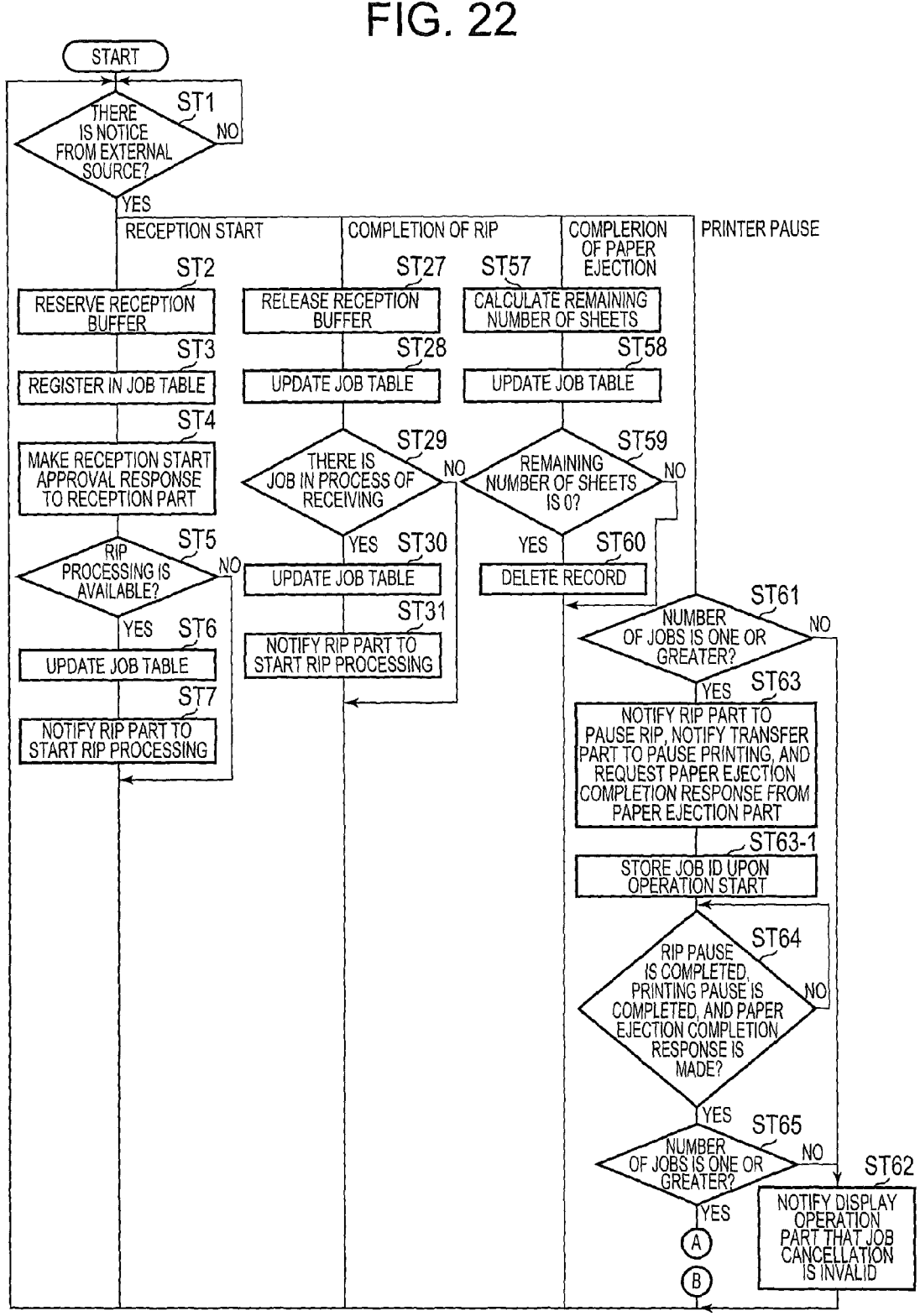
FIG. 22 is a flowchart for explaining the processing of the control part in Embodiment 1.
Figure 23:
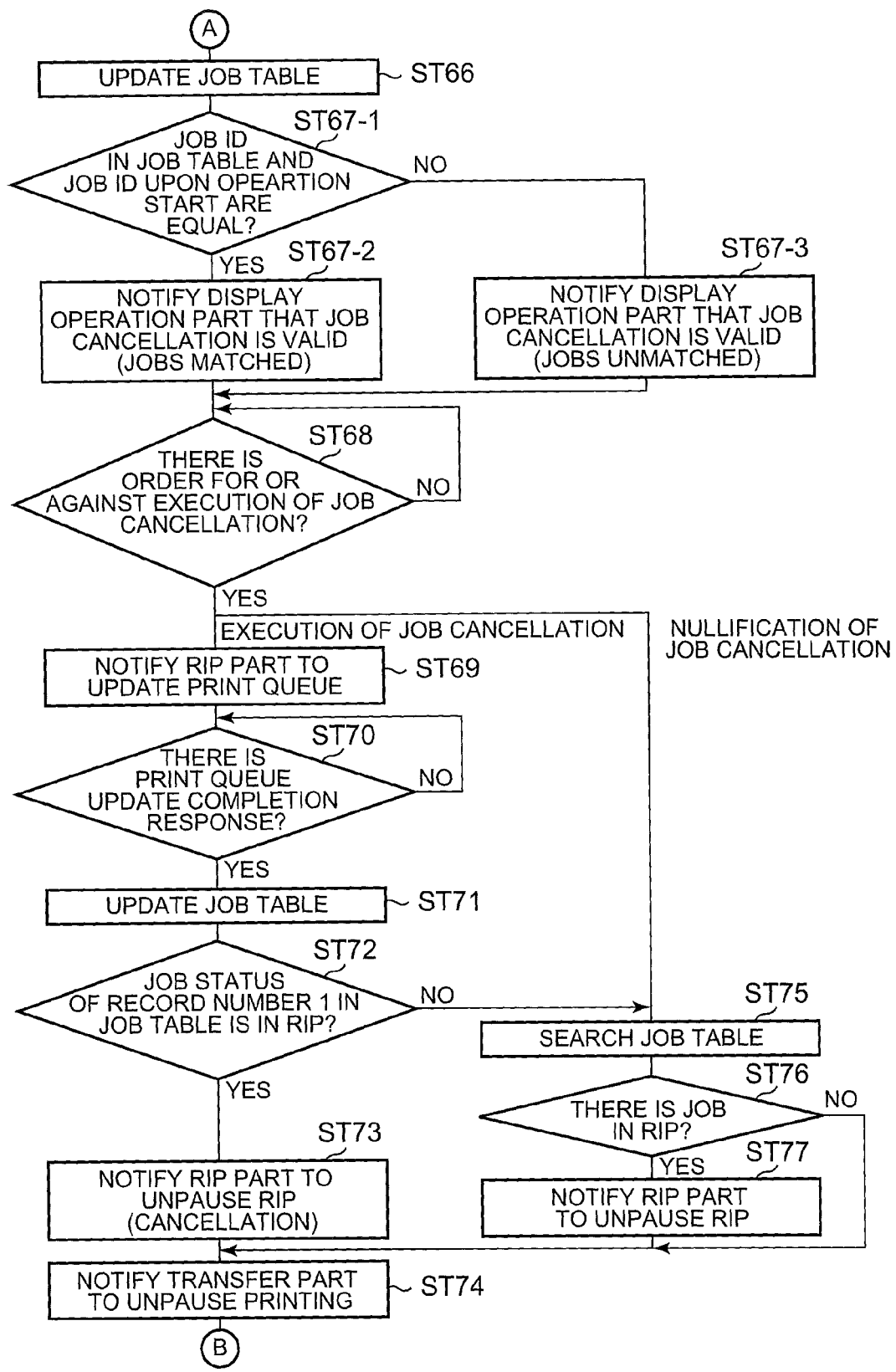
FIG. 23 is a flowchart for explaining the processing of the control part in Embodiment 1.
Figure 24:
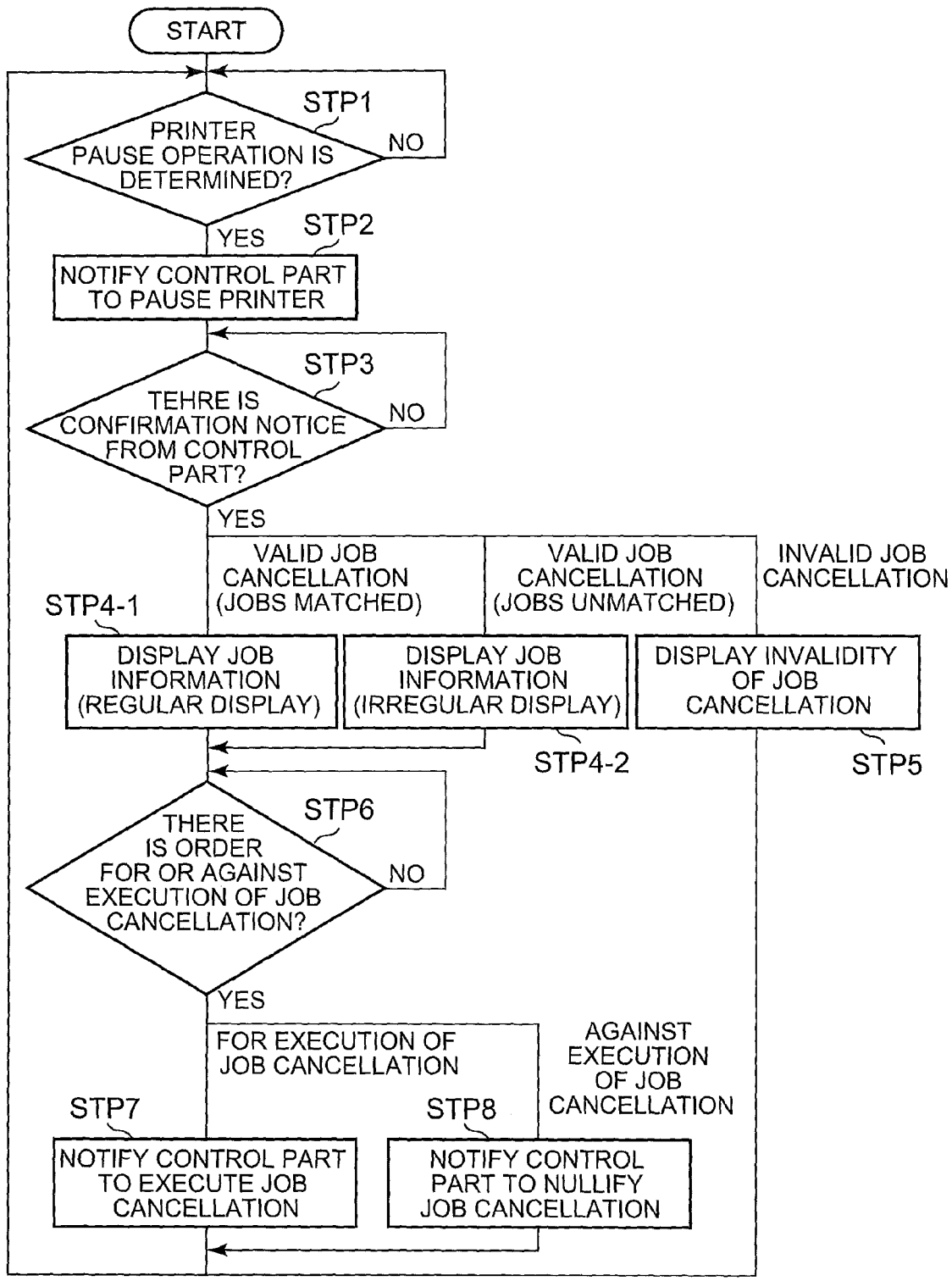
FIG. 24 is a flowchart for explaining the processing of the display operation control part in Embodiment 1.

FIGS. 22 and 23 are flowcharts for explaining the processing/operation of the control part 4. FIG. 24 is a flowchart for explaining the processing/operation of the display operation control part 11. Here, the flowchart shown in FIG. 22 is the above-described flowchart shown in FIG. 14 plus the processing of this embodiment, the flowchart shown in FIG. 23 is the above-described flowchart shown in FIG. 15 plus the processing of this embodiment, and the flowchart shown in FIG. 24 is the above-described flowchart shown in FIG. 20 plus the processing of this embodiment. Therefore, the processes in FIGS. 22, 23, and 24 that are the same as those in the corresponding figure are referred to by the same reference numbers and their explanation will be omitted.

As described above, as the operation button 13 is operated and an operation signal is entered into the display operation control part 11, the display operation control part 11 acknowledges a job cancellation order based on the operation signal from the operation button 13 and notifies the control part 4 to pause the printer (YES in STP1, STP2).

Notified from the display operation control part 11 to pause the printer (YES in ST1), the control part 4 determines whether the number of print jobs is one or greater (ST61) and if the number of print jobs is one or greater (YES in ST61), notifies the RIP part 5 to pause the RIP processing, notifies the transfer part 6 to pause the printing, and requests a paper ejection completion response from the paper ejection part 8 (ST63) as described above. Furthermore, in this embodiment, the control part 4 stores information on the print job ID of which the printing is in progress in the job-ID-upon-cancel-operation storage 15 (ST63-1). For example, if the print job ID of which the printing is in progress at the time is "J0004" (the document name "Price List") shown in FIG. 6, the control part 4 stores the print job ID "J0004" in the job-ID-upon-cancel-operation storage 15. Furthermore, if the print job ID of which the printing is in progress is "J0005" (the document name "Layout Diagram"), the control part 4 stores the print job ID "J0005" in the job-ID-upon-cancel-operation storage 15.

On the other hand, receiving the RIP pause notice, the RIP part 5 immediately notifies the control part 4 that the RIP pause is completed if there is no ongoing RIP processing. On the other hand, the RIP part 5 completes the ongoing RIP processing for a page and notifies the control part 4 that the RIP pause is completed if there is any ongoing RIP processing. Subsequently, the RIP part 5 waits for a RIP unpause notice from the control part 4.

Furthermore, notified from the control part 4 to pause the printing, the transfer part 6 pauses the image data transfer if there is no ongoing transfer, or completes the ongoing image data transfer if there is any ongoing transfer, and notifies the control part 4 that the printing pause is completed. Subsequently, the transfer part 6 waits for a printing unpause notice from the control part 4.

Furthermore, receiving a paper ejection completion response request from the control part 4, the paper ejection part 8 makes a paper ejection completion response to the control part 4 when the paper ejection part 8 is not currently in wait for print paper ejection from the printer engine. On the other hand, the paper ejection part 8 makes a paper ejection completion response to the control part 4 after waiting for a print paper ejection notice from the printer engine for all queues of which the drawing state is "transfer" in the print queue when the paper ejection part 8 is currently in wait for print paper ejection.

Receiving the RIP pause completion response from the RIP part 5, printing pause completion response from the transfer part 6, and paper ejection completion response from the paper ejection part 8 (YES in ST64), the control part 4 determines again whether the number of print jobs is one or greater (ST65). If the number of print jobs is one or greater (YES in ST65), the control part 4 updates the job table 10 (ST65), and determines whether the current print job ID is equal to the print job ID stored in the job-ID-upon-cancel-operation storage 15 (ST67-1). Here, if the print job IDs are equal (YES in ST67-1), the control part 4 notifies the display operation control part 11 that the job IDs are equal and the job cancellation is valid (ST67-2). On the other hand, if the job IDs are not equal (NO in ST67-1), the control part 4 notifies that the job cancellation is valid but the job IDs are not equal (ST67-3).

The display operation control part 11 waits for the above notice from the control part 4 (STP3). Receiving the notice from the control part 4 (YES in STP3), the display operation control part 11 displays invalidity of the job cancellation if the job cancellation is invalid (STP5).

On the other hand, receiving the notice that the print job IDs are equal and the job cancellation is valid from the control part 4, the display operation control part 11 conducts regular job information display (STP4-1) and waits for an order for or against execution of the job cancellation (STP-6).

Figure 25A:
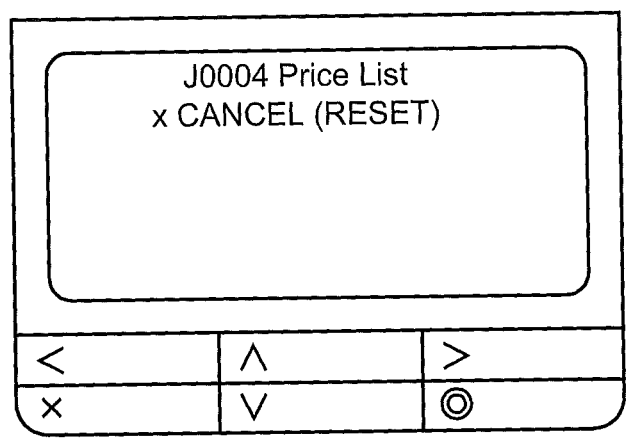
FIG. 25A is an illustration showing an exemplary regular display upon job cancellation.

FIG. 25A shows an example of the above display, displaying information on the job ID and document name on which the job cancellation order is issued. For example, in the example of the figure, information on the print job "J0004" (the document name "Price List") is displayed and "x cancel (reset)" is also displayed. Seeing this display, the user can easily confirm that the print job to be cancelled is the print job specified. Therefore, the user who saw the display presses a button "double-circle" to execute the print job (YES in STP6, STP7) or presses a button "x" to cancel the print job (YES in STP6, STP8).

On the other hand, in the case of being notified from the control part 4 that the job cancellation is valid butnd the job ID stored in the job-ID-upon-cancel-operation storage 15 is not equal to the current job ID, the display operation control part 11 conducts irregular job information display on the display panel 12 (STP4-2) and waits for an order for or against execution of the job cancellation (STP6).

Figure 25B:
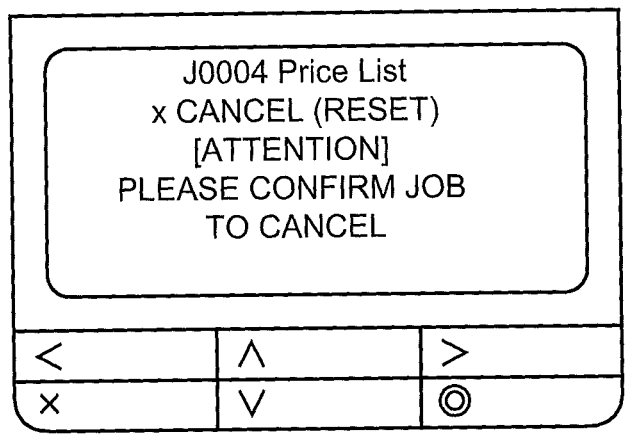
FIG. 25B is an illustration showing an exemplary irregular display upon job cancellation.

FIG. 25B shows an exemplary display of the above case, displaying the job ID and document name on which the job cancellation order is issued and a message to call attention. For example, in the example of FIG. 25B, information on the print job having the job ID "J0004" and the document name "Price List" is displayed, "x cancel (rest)" is also displayed, and "[ATTENSION] Please confirm the job to cancel" is displayed. Seeing the display, the user can easily recognize from the display that the print job to be cancelled is not the print job specified. Then, the user who saw the display presses the button "x" if he/she wants to cancel the print job (YES in STP6, STP8)

The above-described processing can prevent, for example, the user who is familiar with the job cancellation operation from conducting the second panel operation without checking the job to be cancelled well.

The above-described display shown in FIG. 25B is a display for announcing that the print job to be canceled does not match. Other than the above-described display, for example, display blinking or different in color can be used. Furthermore, display in boldface or in different font or the above-described display with attention-calling sound can be used.

Embodiment 2 of the present invention will be described hereafter.

Figure 26:
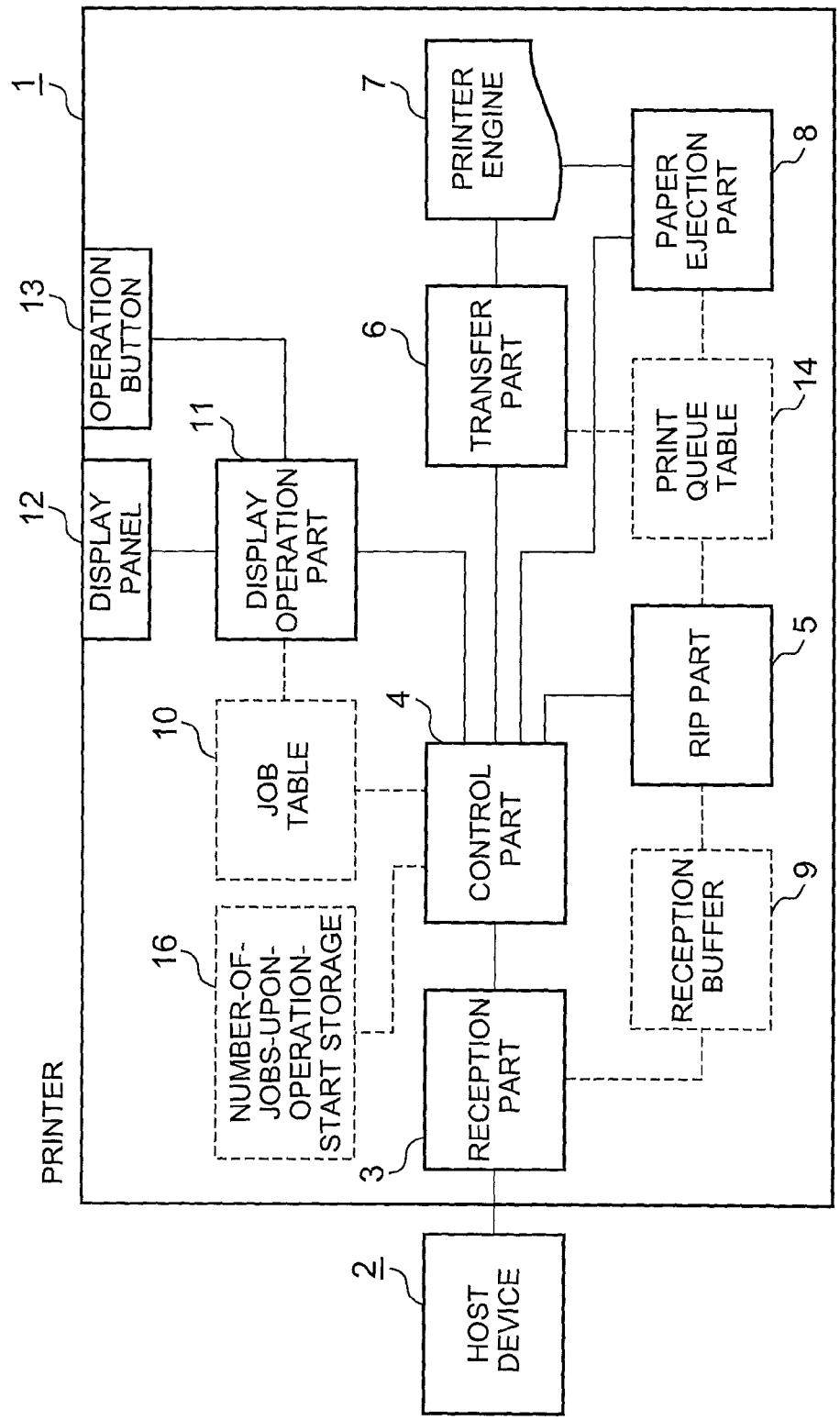
FIG. 26 is an illustration showing the system configuration of Embodiment 2.

FIG. 26 is an illustration showing the system configuration of this embodiment, which is basically the same as the system described with reference to FIG. 1 except that a number-of-jobs-upon-cancel-operation storage 16 shown in the figure is added. In other words, the printer 1 of this embodiment is also connected to the host device 2 via a network such as a LAN, and composed of the reception part 3, control part 4, RIP part 5, transfer part 6, printer engine 7, paper ejection part 8, reception buffer 9, job table 10, display operation control part 11, display panel 12, operation button 13, print queue table 14, and number-of-jobs-upon-cancel-operation storage 16. The number-of-jobs-upon-cancel-operation storage 16 used in this embodiment stores the number of print jobs stored in the job table 10 when the user operates the operation button 13.

Figure 27:
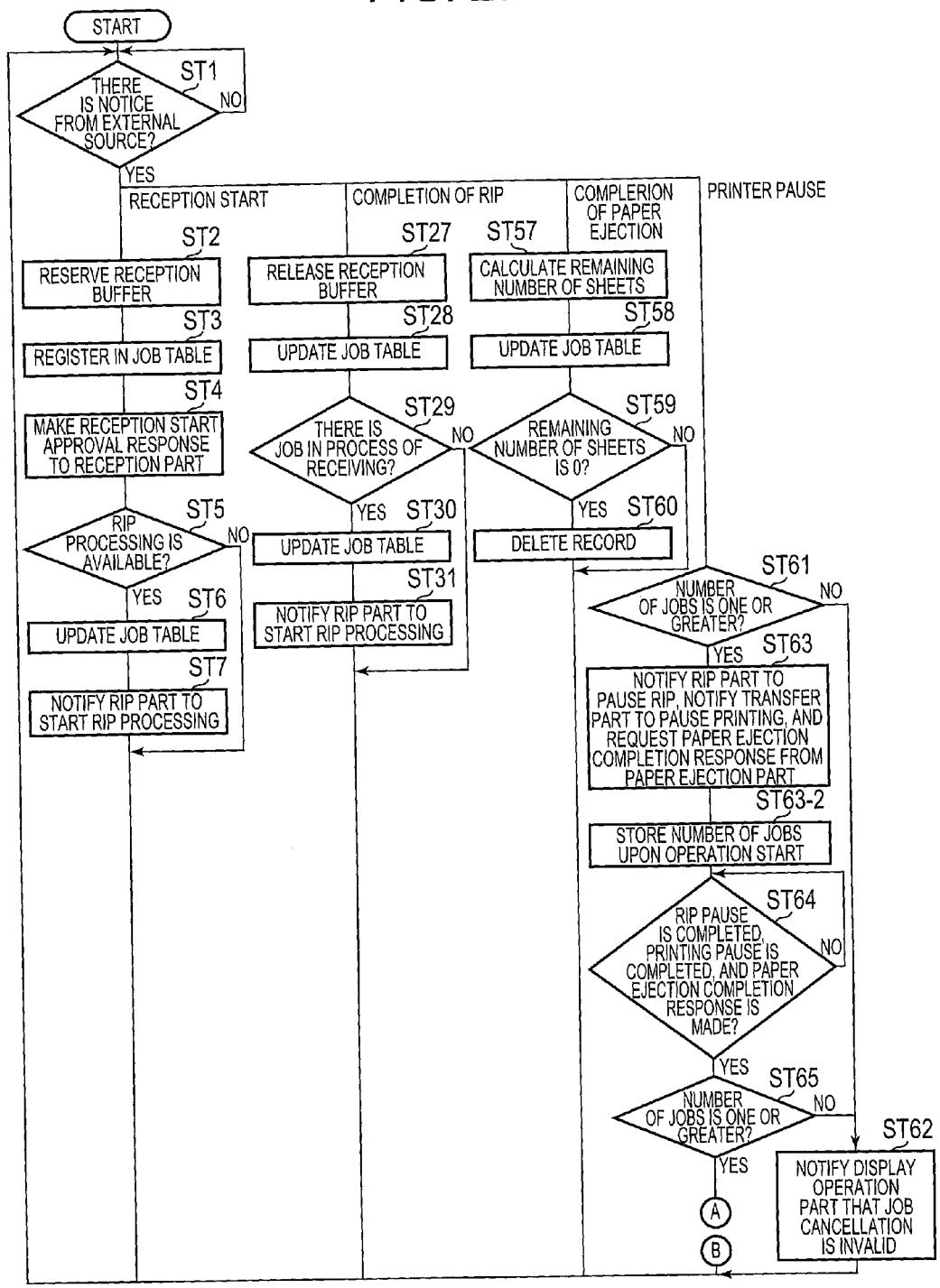
FIG. 27 is a flowchart for explaining the processing of the control part in Embodiment 2.
Figure 28:
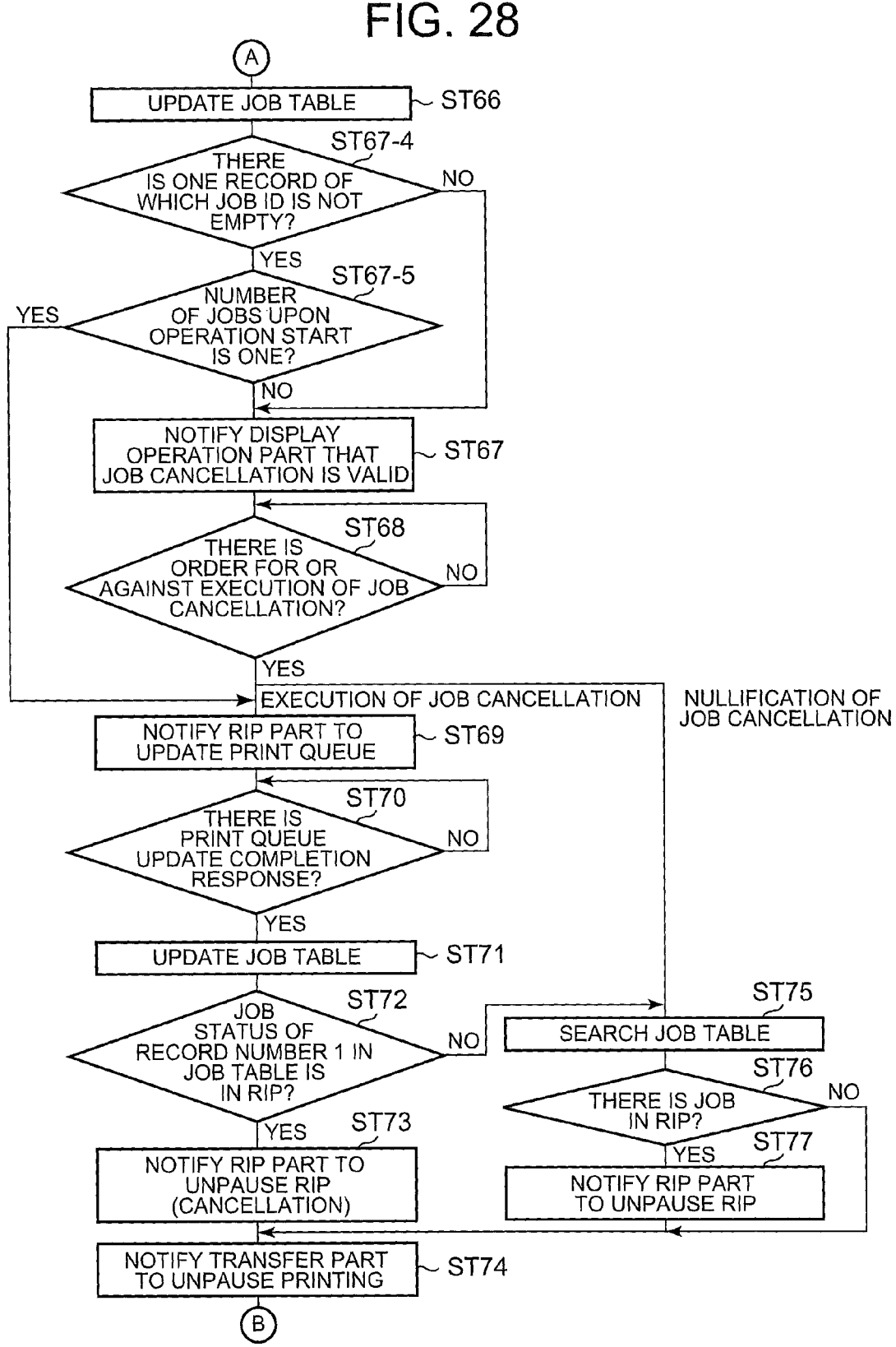
FIG. 28 is a flowchart for explaining the processing of the control part in Embodiment 2.

FIGS. 27 and 28 are flowcharts for explaining the processing of this embodiment, explaining the processing of the control part 4. Here, the flowchart shown in FIG. 27 is the above-described flowchart shown in FIG. 14 plus the processing of this embodiment and the flowchart shown in FIG. 28 is the above-described flowchart shown in FIG. 15 plus the processing of this embodiment. Therefore, the processes in FIGS. 27 and 28 that are the same as those in the corresponding figure are referred to by the same reference numbers and their explanation will be omitted.

As described above, as the operation button 13 is operated and an operation signal is entered into the display operation control part 11, the display operation control part 11 acknowledges a job cancellation order based on the operation signal from the operation button 13 and notifies the control part 4 to pause the printer.

Notified from the display operation control part 11 to pause the printer (YES in ST1), the control part 4 determines whether the number of print jobs is one or greater (ST61), and if the number of print jobs is one or greater (YES in ST61), notifies the RIP part 5 to pause the RIP processing, notifies the transfer part 6 to pause the printing, and requests a paper ejection completion response from the paper ejection part 8 (ST63) as described above. Furthermore, in this embodiment, the control part 4 stores information on the number of print jobs of which the processing is currently in progress in the number-of-jobs-upon-cancel-operation storage 16 (S63-2).

On the other hand, receiving the RIP pause notice, the RIP part 5 immediately notifies the control part 4 that the RIP pause is completed if there is no ongoing RIP processing. On the other hand, the RIP part 5 completes the ongoing RIP processing for a page and notifies the control part 4 that the RIP pause is completed if there is any ongoing RIP processing. Subsequently, the RIP part 5 waits for a RIP unpause notice from the control part 4.

Furthermore, notified from the control part 4 to pause the printing, the transfer part 6 pauses the image data transfer if there is no ongoing transfer, or completes the ongoing image data transfer if there is any ongoing transfer, and notifies the control part 4 that the printing pause is completed. Subsequently, the transfer part 6 waits for a printing unpause notice from the control part 4. Furthermore, receiving the paper ejection completion response request from control part 4, the paper ejection part 8 executes the necessary processing and makes a paper ejection completion response to the control part 4.

On the other hand, receiving the RIP pause completion response from the RIP part 5, printing pause completion response from the transfer part 6, and paper ejection completion response from the paper ejection part 8 (YES in ST64), the control part 4 determines again whether the number of print jobs is one or greater (ST65). If the number of print jobs is one or greater (YES in ST65), the control part 4 updates the job table 10 (ST66), and determines whether there is a record of which the job ID is not empty (ST67-4). Here, if the determination (ST67-4) results in YES, the control part 4 further determines whether the number of jobs stored in the number-of-jobs-upon-cancel-operation storage 16 is 1 (ST67-5).

Here, if the number of print jobs stored in the number-of-jobs-upon-cancel-operation storage 16 is 1 (YES in ST67-5), execution of the job cancellation is immediately determined without executing the above-described processing (ST67 and/or ST68). In other words, if the number of current print jobs is 1 and the number of jobs stored in the number-of-jobs-upon-cancel-operation storage 16 is 1, the number of print jobs does not change and the job cancellation is executed without further operation by the user.

With the above processing, the user does not need to operate the operation button 13 again and the target job information can be cancelled with one operation.

Embodiment 3 of the present invention will be described hereafter.

This embodiment utilizes the same system configuration as in the above-described FIG. 21. Therefore, the printer 1 of this embodiment is also connected to the host device 2 via a network such as a LAN, and composed of the reception part 3, control part 4, RIP part 5, transfer part 6, printer engine 7, paper ejection part 8, reception buffer 9, job table 10, display operation control part 11, display panel 12, operation button 13, print queue table 14, and job-ID-upon-cancel-operation storage 15.

Figure 29:
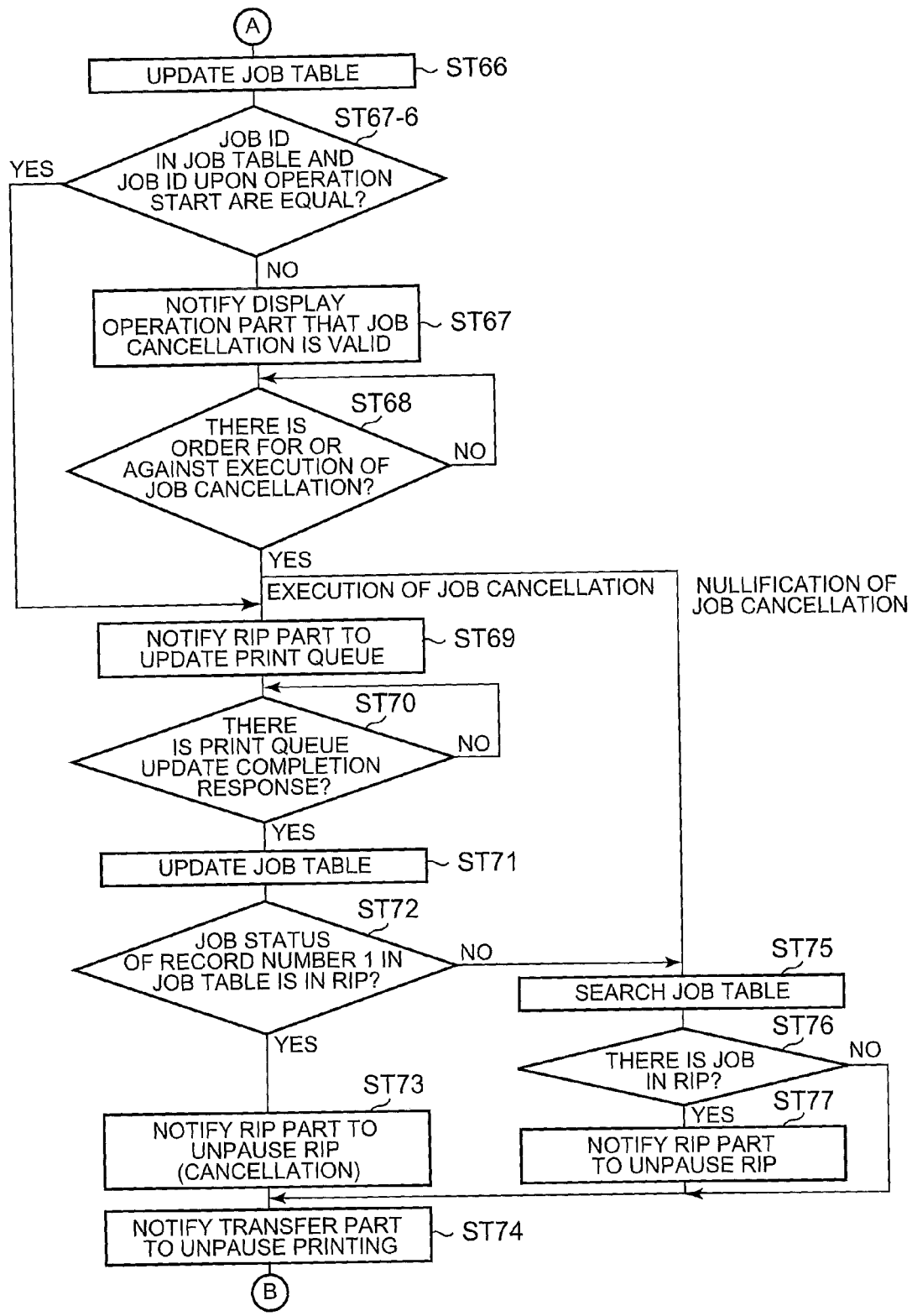
FIG. 29 is a flowchart for explaining the processing of the control part in Embodiment 3.

FIG. 29 is a flowchart for explaining the processing/operation of the control part 4 in this embodiment. Here, the flowchart shown in FIG. 29 is the above-described flowchart shown in FIG. 15 plus the processing of this embodiment. Therefore, the processes in FIG. 29 that are the same as those in the corresponding figure are referred to by the same reference numbers and their explanation will be omitted.

As described above, as the operation button 13 is operated and an operation signal is entered into the display operation control part 11, the display operation control part 11 acknowledges a job cancellation order based on the operation signal from the operation button 13 and notifies the control part 4 to pause the printer. Subsequently, the display operation control part 11 waits for confirmation notice from the control part 4.

If the number of print jobs is one or greater, the control part 4 notifies the RIP part 5 to pause the RIP processing, notifies the transfer part 6 to pause the printing, and requests a paper ejection completion response from the paper ejection part 8 as described above. Furthermore, in this embodiment, the control part 4 stores information on the job ID of which the printing is currently in progress in the job-ID-upon-cancel-operation storage 15.

On the other hand, receiving the RIP pause notice, the RIP part 5 immediately notifies the control part 4 that the RIP pause is completed if there is no ongoing RIP processing. On the other hand, the RIP part 5 completes the ongoing RIP processing for a page and notifies the control part 4 that the RIP pause is completed if there is any ongoing RIP processing. Subsequently, the RIP part 5 waits for a RIP unpause notice from the control part 4.

Furthermore, notified from the control part 4 to pause the printing, the transfer part 6 pauses the image data transfer if there is no ongoing transfer, or completes the ongoing image data transfer if there is any ongoing transfer, and notifies the control part 4 that the printing pause is completed. Subsequently, the transfer part 6 waits for a printing unpause notice from the control part 4. Furthermore, receiving the paper ejection response request from control part 4, the paper ejection part 8 executes the necessary processing and makes a paper ejection completion response to the control part 4.

On the other hand, receiving the RIP pause completion response from the RIP part 5, printing pause completion response from the transfer part 6, and paper ejection completion response from paper ejection part 8, the control part 4 determines again whether the number of print jobs is one or greater. If the number of print jobs is one or greater, the control part 4 updates the job table 10 (ST66), and determines whether the print job ID stored in the job-ID-upon-cancel-operation storage 15 and current print job ID are equal (ST67-6). Here, if the determination (ST67-7) results in YES, the control part 4 immediately determines execution of the job cancellation without executing the above-described processing (ST67 and/or ST68). In other words, the current print job ID and the print job ID stored in the job-ID-upon-cancel-operation storage 15 are equal, the print job to be cancelled does not change, and the job cancellation is executed without further operation by the user.

With the above processing, the user does not need to operate the operation button 13 again and the target job information can be cancelled with one operation.

The procedures shown in the flowcharts in the embodiments of the present invention are applicable to various devices by writing them on a storage medium such as a magnetic disc, optical disc, and semiconductor memory as recording control programs that can be realized by a computer. Alternatively, they are applicable to various devices through communication media transfer. The same efficacy as in the case of using the device of the embodiments can be obtained by storing the procedures described in the embodiments on a desired storage medium and executing the recording control programs on another computer or the like. Here, the computer is not confined to a computer installed in the device described in the embodiments and can be any computer capable of reading the recording control programs stored on a storage medium and comprising an operation device such as a CPU executing control operation according to the read recording control programs.

Several embodiments of the present invention are described above. These embodiments are given by way of example and do not confine the scope of the invention. These novel embodiments can be realized in many different modes and various elimination, replacement, and change can be made without departing from the gist of the invention. These embodiments and their modification fall within the scope and gist of the invention and within the invention set forth in the scope of claims and the scope equivalent thereto.

Having described and illustrated the principles of this application by reference to one (or more) preferred embodiment(s), it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A printing device comprising:
a receiver which receives a print job sent from a host device;
a print processor which executes printing on one or more recording media based on print data included in the print job received by the receiver;
a job table in which administrative information of the print job received by the receiver is registered and stored;
a controller which (i) registers, upon reception of a print job by the receiver, the administrative information of the print job received by the receiver in the job table, (ii) orders the print processor to execute printing based on the registered print job, (iii) adds information indicating that the printing is in progress to the administrative information of the print job on which the execution is ordered, (iv) inquires of the print processor whether ejection of a recording medium corresponding to the print job on which the execution of printing is ordered from the print processor is completed, and (v) deregisters from the job table the print job registered in the job table if an ejection completion response is made;
a job cancellation inputter through which a user inputs a job cancellation order to cancel the printing of a print job in the process of printing; and
a job-ID-upon-cancel-operation storage which stores an ID of the print job in the process of printing when the job cancellation order is input from the job cancellation inputter,
wherein the controller outputs an order to pause ongoing printing to the print processor according to the job cancellation order input from the job cancellation inputter;
wherein when a recording medium is being printed at a time of receiving the order to pause the printing from the controller, the print processor completes the ordered pause of printing after the recording medium is completely ejected, and outputs a response indicating the completion of pause of printing to the controller;
wherein when (i) an ID of a print job having the information added to the administrative information thereof in the job table which indicates that the printing of the print job is in progress at a time of receiving the response indicating the completion of pause of printing from the print processor and (ii) the ID stored in the job-ID-upon-cancel-operation storage are equal, the controller cancels the printing of said print job having the print job ID, and deletes said print job; and
wherein the controller displays an indication that the job cancellation order will effectively be executed when the ID of the print job having the information added to the administrative information thereof in the job table which indicates that the printing of the print job is in progress at the time of receiving the response indicating the completion of pause of printing from the print processor and the ID stored in the job-ID-upon-cancel-operation storage are equal, and displays information presenting the print job to be cancelled for urging the user to confirm whether the print job the controller is about to cancel is exactly the print job specified in the job cancellation order when the print job IDs are not equal.

2. The printing device according to claim 1, wherein:
multiple pieces of administrative information of the print job are registered and stored in the job table;
the controller (i) registers the administrative information in sequence in an order of reception of the print job received by the receiver, (ii) deletes the administrative information of the print job to which the information indicating that the printing is in progress is added according to a paper ejection completion response from the print processor, and (iii) orders the print processor to execute the printing of a next print job.

3. A printing device comprising:
a receiver which receives a print job sent from a host device;
a print processor which executes printing on one or more recording media based on print data included in the print job received by the receiver;
a job table in which administrative information of the print job received by the receiver is registered and stored;
a controller which (i) registers, upon reception of the print job by the receiver, administrative information of the print job received by the receiver in the job table, (ii) counts and stores a number of registered print jobs, (iii) orders the print processor to execute printing based on the registered print job, (iv) inquires of the print processor whether ejection of a recording medium corresponding to the print job on which the execution of printing is ordered from the print processor is completed, and (v) deregisters from the job table the print job registered in the job table if an ejection completion response is made;
a job cancellation inputter through which a job cancellation order for cancelling the printing of a print job in the process of printing is input; and
a number-of-jobs-upon-cancel-operation storage which stores a number of print jobs registered in the job table when the job cancellation order is input from the job cancellation inputter,
wherein the controller outputs an order to pause the ongoing printing to the print processor according to the job cancellation order input from the job cancellation inputter;
wherein when a recording medium is being printed at a time of receiving the order to pause the printing from the controller, the print processor completes the ordered pause of printing after the recording medium is completely ejected, and outputs a response indicating the completion of pause of printing to the controller;
wherein when (i) a number of print jobs registered in the job table at a time of receiving the response indicating the completion of pause of printing from the print processor and (ii) the number stored in the number-of-jobs-upon-cancel-operation storage are equal, the controller cancels the printing of the print job in the process of printing, and deletes said print job; and
wherein the controller displays an indication that the job cancellation order will effectively be executed when the number of print jobs registered in the job table at the time of receiving the response indicating the completion of pause of printing from the print processor and the number stored in the number-of-jobs-upon-cancel-operation storage are equal, and displays information presenting the print job to be cancelled for urging the user to confirm whether the print job the controller is about to cancel is exactly the print job specified in the job cancellation order when the numbers of print jobs are not equal.

4. The printing device according to claim 3, wherein:
the controller (i) registers the administrative information in sequence in an order of reception of the print job received by the receiver, (ii) deletes the administrative information of the print job to which information indicating that the printing is in progress is added according to a paper ejection completion response from the print processor, and (iii) orders the print processor to execute the printing of a next print job.

5. The printing device according to claim 3, wherein:
the controller cancels the printing of the print job registered in the job table having information added to the administrative information thereof indicating that the printing is in progress, when a response indicating completion of the ordered pause of printing is made and the number of print jobs registered in the job table is one.

6. A printing method in a printing device including: (i) a receiver for receiving a print job sent from a host device; (i) a print processor for executing printing on one or more recording media based on print data included in the print job received by the receiver; and (iii) a job table in which administrative information of the print job received by the receiver is registered and stored, wherein the method comprises:
registering, upon reception of a print job by the receiver, administrative information of the print job in the job table, ordering the print processor to execute printing based on the registered print job, and adding information indicating that the printing is in progress to the administrative information of the print job on which the execution is ordered;
inquiring of the print processor whether ejection of a recording medium corresponding to the print job on which the execution of printing is ordered from the print processor is completed, and deregistering the print job registered in the job table from the job table if an ejection completion response is made;
receiving via a job cancellation inputter, an input of a job cancellation order for cancelling the printing of a print job in the process of printing;
storing, in a job-ID-upon-cancel-operation storage, an ID of the print job in the process of printing when the job cancellation order is input from the job cancellation inputter;
outputting, to the print processor, an order to pause ongoing printing according to the job cancellation order input from the job cancellation inputter;
wherein when a recording medium is being printed at a time of receiving the order to pause the printing, the print processor completes the ordered pause of printing after the recording medium is completely ejected, and outputs a response indicating the completion of pause of printing;
wherein when (i) an ID of a print job having the information added to the administrative information thereof in the job table which indicates that the printing of the print job is in progress at a time of receiving the response indicating the completion of pause of printing from the print processor and (ii) the ID stored in the job-ID-upon-cancel-operation storage are equal, the printing of the print job having the print job ID is cancelled, and said print job is deleted; and
wherein an indication that the job cancellation order will effectively be executed is displayed when the ID of the print job having the information added to the administrative information thereof in the job table which indicates that the printing of the print job is in progress at the time of receiving the response indicating the completion of pause of printing from the print processor and the ID stored in the job-ID-upon-cancel-operation storage are equal, and information presenting the print job to be cancelled for urging the user to confirm whether the print job that is about to be canceled is exactly the print job specified in the job cancellation order is displayed when the print job IDs are not equal.

7. The printing method according to claim 6, wherein:
the job table is capable of registering and storing multiple pieces of administrative information of the print job; and
the administrative information is registered in sequence in an order of reception of the print job received by the receiver, the administrative information of the print job to which the information indicating that the printing is in progress is added is deleted according to a paper ejection completion response from the print processor, and the print processor is ordered to execute the printing of a next print job if there is administrative information of the next print job registered in the job table.

8. A printing method in a printing device including: (i) a receiver for receiving a print job sent from a host device; (ii) a print processor executing printing on one or more recording media based on print data included in the print job received by the receiver; and (iii) a job table in which administrative information of the print job received by the receiver is registered and stored, wherein the method comprises:
registering, upon reception of a print job by the receiver, administrative information of the print job in the job table, counting and storing a number of the registered print jobs, and ordering the print processor to execute printing based on the registered print job;
inquiring of the print processor whether ejection of a recording medium corresponding to the print job on which the execution of printing is ordered from the print processor is completed, and deregistering the print job registered in the job table from the job table if an ejection completion response is made;
receiving via a job cancellation inputter, an input of a job cancellation order for cancelling the printing of a print job in the process of printing, and storing in a number-of-jobs-upon-cancel-operation storage a number of print jobs registered in the job table when the job cancellation order is input from the job cancellation inputter;
outputting an order to pause ongoing printing to the print processor according to the job cancellation order input from the job cancellation inputter;
wherein when a recording medium is being printed at a time of receiving the order to pause the printing, the print processor completes the ordered pause of printing after the recording medium is completely ejected, and outputs a response indicating the completion of pause of printing;
wherein when (i) a number of print jobs registered in the job table at a time of receiving the response indicating the completion of pause of printing from the print processor and (ii) the number stored in the number-of-jobs-upon-cancel-operation storage are equal, the printing of the print job in the process of printing is canceled, and said print job is deleted; and wherein an indication that the job cancellation order will effectively be executed is displayed when the number of print Iobs registered in the job table at the time of receiving the response indicating the completion of pause of printing from the print processor and the number stored in the number-of-jobs-upon-cancel-operation storage are equal, and information presenting the print job to be cancelled for urging the user to confirm whether the print job that is about to be canceled is exactly the print job specified in the job cancellation order is displayed when the numbers of print jobs are not equal.

9. The printing method according to claim 8, wherein:
the administrative information is registered in sequence in an order of reception of the print job received by the receiver, the administrative information of the print job to which information indicating that the printing is in progress is added is deleted according to a paper ejection completion response from the print processor, and the print processor is ordered to execute the printing of a next print job.

10. The printing method according to claim 8, wherein:
the printing of the print job registered in the job table having information added to the administrative information thereof indicating that the printing is in progress is cancelled when a response indicating completion of the ordered pause of printing is made by the print processor and the number of print jobs registered in the job table is one.

11. A non-transitory computer-readable storage medium having stored thereon a program that is executable by a computer in a printing device including: (i) a receiver for receiving a print job sent from a host device; (i) a print processor for executing printing on one or more recording media based on print data included in the print job received by the receiver; and (iii) a job table in which administrative information of the print job received by the receiver is registered and stored, wherein program is executable by the computer to cause the computer to execute functions comprising:

registering, upon reception of a print job by the receiver, administrative information of the print job in the job table, ordering the print processor to execute printing based on the registered print job, and adding information indicating that the printing is in progress to the administrative information of the print job on which the execution is ordered;

inquiring of the print processor whether ejection of a recording medium corresponding to the print job on which the execution of printing is ordered from the print processor is completed, and deregistering the print job registered in the job table from the job table if an ejection completion response is made;

receiving via a job cancellation inputter, an input of a job cancellation order for cancelling the printing of a print job in the process of printing;

storing, in a job-ID-upon-cancel-operation storage, an ID of the print job in the process of printing when the job cancellation order is input from the job cancellation inputter;

outputting, to the print processor, an order to pause ongoing printing according to the job cancellation order input from the job cancellation inputter;

wherein when a recording medium is being printed at a time of receiving the order to pause the printing, the print processor completes the ordered pause of printing after the recording medium is completely ejected, and outputs a response indicating the completion of pause of printing;

wherein when (i) an ID of a print job having the information added to the administrative information thereof in the job table which indicates that the printing of the print job is in progress at a time of receiving the response indicating the completion of pause of printing from the print processor and (ii) the ID stored in the job-ID-upon-cancel-operation storage are equal, the printing of the print job having the print job ID is cancelled, and said print job is deleted; and wherein an indication that the job cancellation order will effectively be executed is displayed when the ID of the print job having the information added to the administrative information thereof in the job table which indicates that the printing of the print job is in progress at the time of receiving the response indicating the completion of pause of printing from the print processor and the ID stored in the job-ID-upon-cancel-operation storage are equal, and information presenting the print job to be cancelled for urging the user to confirm whether the print job that is about to be canceled is exactly the print job specified in the job cancellation order is displayed when the print job IDs are not equal.

12. The storage medium according to claim 11, wherein:
the job table is capable of registering and storing multiple pieces of administrative information of the print job; and
the administrative information is registered in sequence in an order of reception of the print job received by the receiver, the administrative information to which the information indicating that the printing is in progress is added is deleted according to a paper ejection completion response from the print processor, and the print processor is ordered to execute the printing of a next print job if there is administrative information of the next print job registered in the job table.

13. A non-transitory computer-readable storage medium having stored thereon a program that is executable by a computer in a printing device including: (i) a receiver for receiving a print job sent from a host device; (i) a print processor for executing printing on one or more recording media based on print data included in the print job received by the receiver; and (iii) a job table in which administrative information of the print job received by the receiver is registered and stored, wherein program is executable by the computer to cause the computer to execute functions comprising:

registering, upon reception of a print job by the receiver, administrative information of the print job in the job table, counting and storing a number of the registered print jobs, and ordering the print processor to execute printing based on the registered print job;

inquiring of the print processor whether ejection of a recording medium corresponding to the print job on which the execution of printing is ordered from the print processor is completed, and deregistering the print job registered in the job table from the job table if an ejection completion response is made;

receiving via a job cancellation inputter, an input of a job cancellation order for cancelling the printing of a print job in the process of printing, and storing in a number-of-jobs-upon-cancel-operation storage a number of print jobs registered in the job table when the job cancellation order input from the job cancellation inputter;

outputting an order to pause ongoing printing to the print processor according to the job cancellation order input from the job cancellation inputter;

wherein when a recording medium is being printed at a time of receiving the order to pause the printing, the print processor completes the ordered pause of printing after the recording medium is completely ejected, and outputs a response indicating the completion of pause of printing;

wherein when (i) a number of print jobs registered in the job table at a time of receiving the response indicating the completion of pause of printing from the print processor and (ii) the number stored in the number-of-jobs-upon-cancel-operation storage are equal, the printing of the print job in the process of printing is canceled, and said print job is deleted; and wherein an indication that the job cancellation order will effectively be executed is displayed when the number of print lobs registered in the job table at the time of receiving the response indicating the completion of pause of printing from the print processor and the number stored in the number-of-jobs-upon-cancel-operation storage are equal, and information presenting the print job to be cancelled for urging the user to confirm whether the print job that is about to be canceled is exactly the print job specified in the job cancellation order is displayed when the numbers of print jobs are not equal.

14. The storage medium according to claim 13, wherein the administrative information is registered in sequence in an order of reception of the print job received by the receiver, the administrative information of the print job to which information indicating that the printing is in progress is added is deleted according to a paper ejection completion response from the print processor, and the print processor is ordered to execute the printing of a next print job.

\* \* \* \* \*

UNITED STATES PATENT AND TRADEMARK OFFICE
CERTIFICATE OF CORRECTION

Page 1 of 1

PATENT NO. : 9,122,976 B2
APPLICATION NO. : 13/630747
DATED : September 1, 2015
INVENTOR(S) : Masaki Kobayashi It is certified that error appears in the above-identified patent and that said Letters Patent is hereby corrected as shown below:

In the Claims

Column 25, Claim 8, line 5,
  delete "lobs" and insert --jobs--.

Column 25, Claim 11, line 35,
  delete "(i)" and insert --(ii)--.

Column 26, Claim 13, line 41,
  delete "(i)" and insert --(ii)--.

Column 27, Claim 13, line 16,
  delete "lobs" and insert --jobs--.

Signed and Sealed this
Fifteenth Day of March, 2016

Michelle K. Lee
*Director of the United States Patent and Trademark Office*